United States Patent
Wittek et al.

(10) Patent No.: US 8,012,370 B2
(45) Date of Patent: Sep. 6, 2011

(54) LIQUID-CRYSTALLINE MEDIUM AND LIQUID-CRYSTAL DISPLAY

(75) Inventors: Michael Wittek, Darmstadt (DE); Brigitte Schuler, Grossostheim (DE); Volker Reiffenrath, Rossdorf (DE); Atsutaka Manabe, Bensheim (JP); Elisabeth Meyer, Langenselbold (DE); Mark Goebel, Darmstadt (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 12/681,461

(22) PCT Filed: Sep. 9, 2008

(86) PCT No.: PCT/EP2008/007366
§ 371 (c)(1), (2), (4) Date: Apr. 2, 2010

(87) PCT Pub. No.: WO2009/046803
PCT Pub. Date: Apr. 16, 2009

(65) Prior Publication Data
US 2010/0243956 A1    Sep. 30, 2010

(30) Foreign Application Priority Data
Oct. 5, 2007 (DE) .......................... 10 2007 047 734

(51) Int. Cl.
*C09K 19/00* (2006.01)
*C09K 19/12* (2006.01)
*C09K 19/52* (2006.01)
*C09K 19/06* (2006.01)

(52) U.S. Cl. ........... 252/299.66; 252/299.01; 252/299.6; 252/299.67; 428/1.1; 430/20

(58) Field of Classification Search ............. 252/299.01, 252/299.6–299.67; 428/1.1; 430/20
See application file for complete search history.

(56) References Cited

U.S. PATENT DOCUMENTS

| 2004/0173776 A1 | 9/2004 | Heckmeier et al. |
| 2009/0059157 A1* | 3/2009 | Haseba et al. ................ 349/182 |
| 2010/0127211 A1* | 5/2010 | Tanaka .................... 252/299.61 |

FOREIGN PATENT DOCUMENTS

| EP | 1 454 975 A2 | 9/2004 |
| WO | WO 2008/105286 A1 | 9/2008 |

OTHER PUBLICATIONS

International Search Report of PCT/EP2008/007366 (Oct. 24, 2008).

* cited by examiner

*Primary Examiner* — Geraldina Visconti
(74) *Attorney, Agent, or Firm* — Millen, White, Zefano & Branigan, P.C.

(57) ABSTRACT

The present invention relates to dielectrically positive liquid-crystalline media comprising a dielectrically positive component, component A, comprising a dielectrically positive compound of the formula (I), in which the parameters have the meaning indicated in the specification, and optionally a second dielectrically positive component, component B, comprising one or more dielectrically positive compounds having a dielectric anisotropy of greater than 3 and optionally a dielectrically neutral component, component C, and to liquid-crystal displays, especially to active-matrix displays and in particular to TN, IPS, FFS and OCB displays, containing these media.

12 Claims, No Drawings

LIQUID-CRYSTALLINE MEDIUM AND LIQUID-CRYSTAL DISPLAY

FIELD OF THE INVENTION

The present invention relates to liquid-crystalline media and to liquid-crystal displays containing these media, especially to displays addressed by an active matrix and in particular to displays of the twisted nematic (TN), in-plane switching (IPS) or fringe-field switching (FFS) type.

STATE OF THE ART AND PROBLEM TO BE SOLVED

Liquid-crystal displays (LCDs) are used in many areas for the display of information. LCDs are used both for direct-view displays and for projection-type displays. The electro-optical modes used are, for example, the twisted nematic (TN), super twisted nematic (STN), optically compensated bend (OCB) and electrically controlled birefringence (ECB) modes together with their various modifications, as well as others. All these modes utilise an electric field which is essentially perpendicular to the substrates or the liquid-crystal layer. Besides these modes, there are also electro-optical modes that utilise an electric field which is essentially parallel to the substrates or the liquid-crystal layer, such as, for example, the in-plane switching (IPS) mode (as disclosed, for example, in DE 40 00 451 and EP 0 588 568) and the fringe-field switching (FFS) mode, in which a strong "fringe field" is present, i.e. a strong electric field close to the edge of the electrodes and, throughout the cell, an electric field which has both a strong vertical component and a strong horizontal component. These latter two electro-optical modes in particular are used for LCDs in modern desktop monitors and are intended for use in displays for TV sets and multimedia applications. The liquid crystals in accordance with the present invention are preferably used in displays of this type. In general, dielectrically positive liquid-crystalline media having rather lower values of the dielectric anisotropy are used in FFS displays, but in some cases liquid-crystalline media having a dielectric anisotropy of only about 3 or even less are also used in IPS displays.

For these displays, novel liquid-crystalline media having improved properties are required. The addressing times in particular have to be improved for many types of application. Thus, liquid-crystalline media having lower viscosities ($\eta$), especially having lower rotational viscosities ($\gamma_1$), are required. The rotational viscosity should be 80 mPa·s or less, preferably 60 mPa·s or less and especially 55 mPa·s or less. Besides this parameter, the media must have a nematic phase range of suitable width and position and an appropriate birefringence ($\Delta n$), and the dielectric anisotropy ($\Delta \epsilon$) should be sufficiently high to allow a reasonably low operating voltage. $\Delta \epsilon$ should preferably be greater than 3 and very preferably greater than 3, but preferably not greater than 21 and in particular not greater than 19, as this would prevent an at least fairly high resistivity.

The displays in accordance with the present invention are preferably addressed by an active matrix (active-matrix LCDs, AMDs for short), preferably by a matrix of thin-film transistors (TFTs). However, the liquid crystals according to the invention can also advantageously be used in displays having other known addressing means.

There are numerous different display modes which use composite systems of low-molecular-weight liquid-crystal materials together with polymeric materials. These are, for example, polymer dispersed liquid crystal (PDLC), nematic curvilinearly aligned phase (NCAP) and polymer network (PN) systems, as disclosed, for example, in WO 91/05 029, or axially symmetric microdomain (ASM) systems and others. In contrast to these, the modes that are especially preferred in accordance with the present invention use the liquid-crystal medium as such, oriented on surfaces. These surfaces are typically pretreated in order to achieve uniform alignment of the liquid-crystal material. The display modes in accordance with the present invention preferably use an electric field which is substantially parallel to the composite layer.

Liquid-crystal compositions which are suitable for LCDs and especially for IPS displays are known, for example, from JP 07-181 439 (A), EP 0 667 555, EP 0 673 986, DE 195 09 410, DE 195 28 106, DE 195 28 107, WO 96/23 851 and WO 96/28 521. However, these compositions have severe disadvantages. Amongst other deficiencies, most of them result in disadvantageously long addressing times, have inadequate values of the resistivity and/or require excessively high operating voltages.

Thus, there is a considerable need for liquid-crystalline media having suitable properties for practical applications, such as a broad nematic phase range, suitable optical anisotropy $\Delta n$ corresponding to the display type used, a high $\Delta \epsilon$ and particularly low viscosities.

PRESENT INVENTION

Surprisingly, it has now been found that it is possible to achieve liquid-crystalline media having a suitably high $\Delta \epsilon$, a suitable phase range and $\Delta n$ which do not exhibit the disadvantages of the materials from the prior art, or at least only do so to a significantly lesser extent.

These improved liquid-crystalline media in accordance with the present application comprise at least the following components:
a first dielectrically positive component, component A, comprising one or more dielectrically positive compounds of the formula I

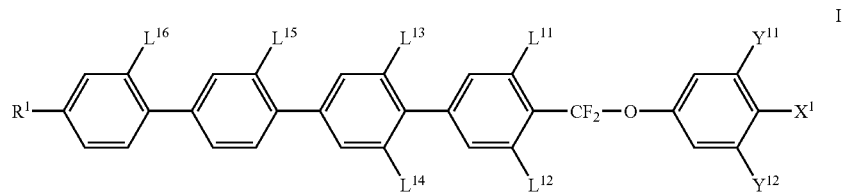

in which $R^1$ denotes alkyl, alkoxy, fluorinated alkyl or fluorinated alkoxy having 1 to 7 C atoms, alkenyl, alkenyloxy, alkoxyalkyl or fluorinated alkenyl, alkenyloxy or alkoxyalkyl having 2 to 7 C atoms and preferably alkyl or alkenyl, $X^1$ denotes —CN, halogen, halogenated alkyl or halogenated alkoxy having 1 to 3 C atoms or halogenated alkenyl or halogenated alkenyloxy having 2 or 3 C atoms, preferably F, Cl, —OCF$_3$, —CF$_3$ or —O—CH=CF$_2$, more preferably F, Cl or —OCF$_3$ and very preferably F, $Y^{11}$ and $Y^{12}$, independently of one another, denote H or F, preferably $Y^{11}$ denotes F and particularly preferably $Y^{11}$ and $Y^{12}$ both denote F, and $L^{11}$ to $L^{16}$, independently of one another, denote H or F, preferably one, two or more denote F, particularly preferably one, two or more of $L^{11}$, $L^{13}$, $L^{15}$ and $L^{16}$ denote F, and very particularly preferably $L^{11}$ to $L^{13}$ and $L^{15}$ all denote F, and optionally a further dielectrically positive component, component B, comprising one or more dielectrically positive compounds, preferably having a dielectric anisotropy of greater than 3, preferably selected from the group of the compounds of the formulae II and III:

II

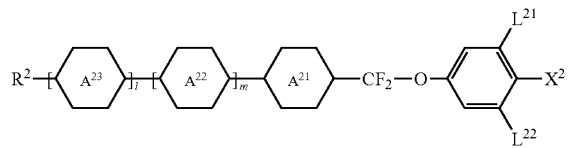

III

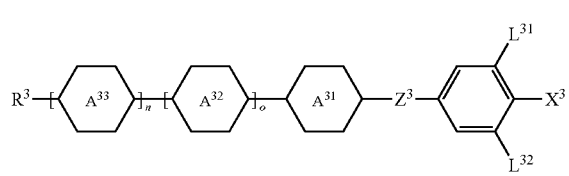

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and preferably $R^2$ and $R^3$ denote alkyl or alkenyl,

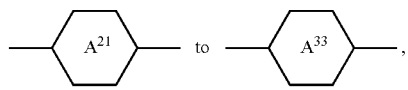

independently of one another, denote

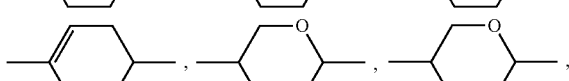

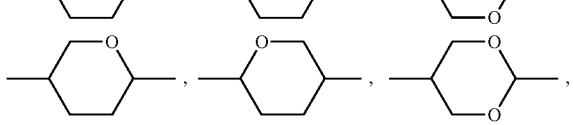

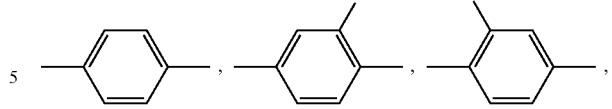

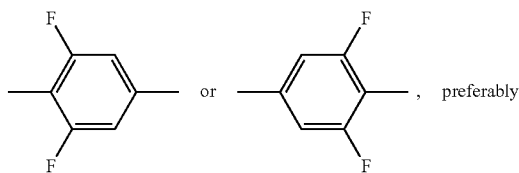, preferably

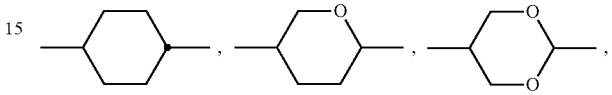

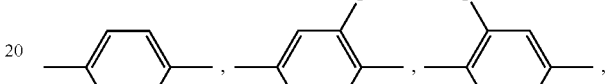

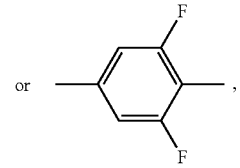

$L^{21}$, $L^{22}$, $L^{31}$ and $L^{32}$, independently of one another, denote H or F, preferably $L^{21}$ and/or $L^{31}$ denote F, $X^2$ and $X^3$, independently of one another, denote halogen, halogenated alkyl or alkoxy having 1 to 3 C atoms or halogenated alkenyl or alkenyloxy having 2 or 3 C atoms, preferably F, Cl, —OCF$_3$ or —CF$_3$, very preferably F, Cl or —OCF$_3$, $Z^3$ denotes —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond and very preferably —COO—, trans-CH=CH— or a single bond, and l, m, n and o, independently of one another, denote 0 or 1, and optionally a dielectrically neutral component, component C, comprising one or more dielectrically neutral compounds of the formula IV

IV

in which $R^{41}$ and $R^{42}$, independently of one another, have the meaning indicated above for $R^2$ under formula II, preferably $R^{41}$ denotes alkyl and $R^{42}$ denotes alkyl or alkoxy or $R^{41}$ denotes alkenyl and $R^{42}$ denotes alkyl,

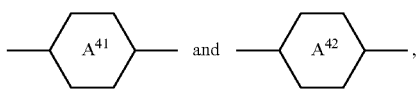

independently of one another and, if

occurs twice, also these independently of one another, denote

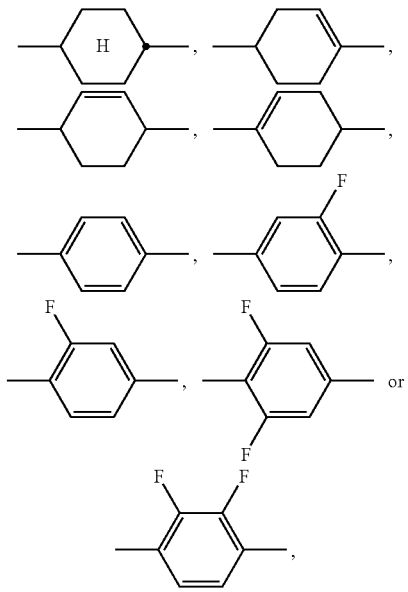

preferably one or more of

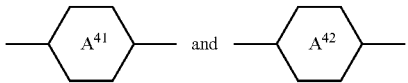

denotes/denote

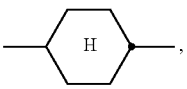

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more thereof denotes/denote a single bond, and p denotes 0, 1 or 2, preferably 0 or 1.

Component A preferably comprises, more preferably predominantly consists of, even more preferably essentially consists of and very preferably completely consists of one or more dielectrically positive compounds of the formula I having a dielectric anisotropy of greater than 3 and in which the parameters have the respective meanings indicated above under formula I and $X^1$ preferably denotes F.

In a preferred embodiment of the present invention, component A comprises, more preferably predominantly consists of, even more preferably essentially consists of and very preferably completely consists of one or more dielectrically positive compounds having a dielectric anisotropy of greater than 3, selected from the group of the compounds of the formulae IA and IB:

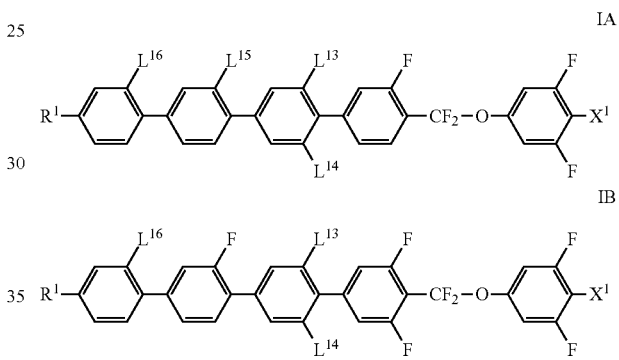

in which the parameters have the meanings given above under formula I, and $X^1$ preferably denotes F, Cl, CF$_3$ or OCF$_3$, particularly preferably F or Cl and very particularly preferably F.

In a preferred embodiment of the present invention, component A comprises, more preferably predominantly consists of, even more preferably essentially consists of and very preferably completely consists of one or more dielectrically positive compounds having a dielectric anisotropy of greater than 3, selected from the group of the compounds of the formulae IA-1 to IA-3: :

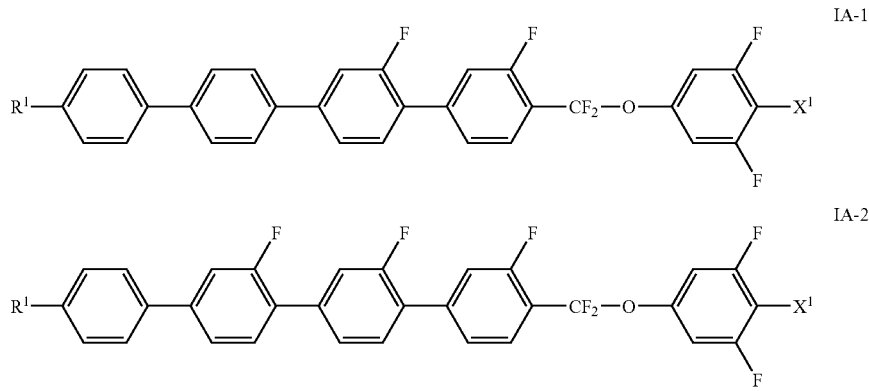

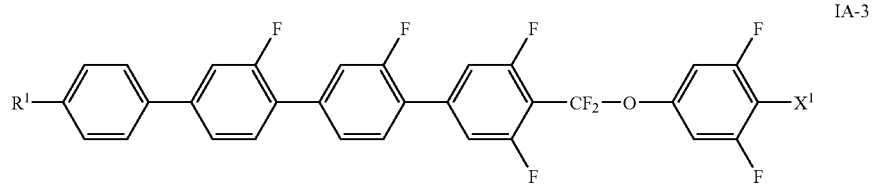

IA-3 in which the parameters have the respective meanings indicated above under formula I or IA, and $X^1$ preferably denotes F, Cl, $CF_3$ or $OCF_3$, particularly preferably F or Cl and very particularly preferably F.

In a preferred embodiment of the present invention, component A comprises, more preferably predominantly consists of, even more preferably essentially consists of and very preferably completely consists of one or more dielectrically positive compounds having a dielectric anisotropy of greater than 3, selected from the group of the compounds of the formulae IB-1 and IB-2:

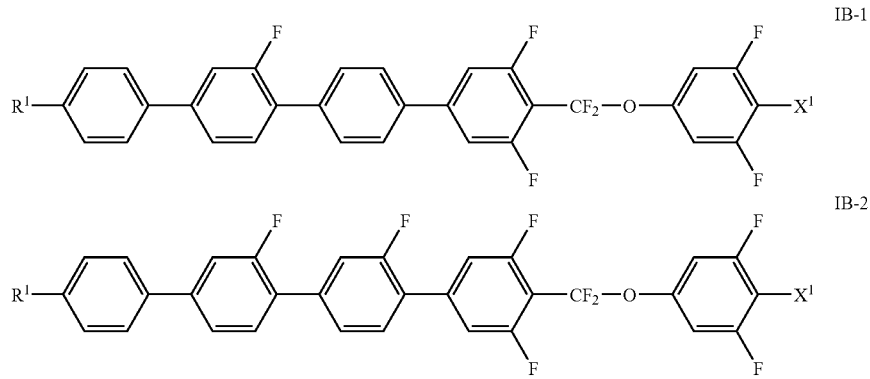

in which the parameters have the respective meanings indicated above under formula I or IB, and $X^1$ preferably denotes F, Cl, $CF_3$ or $OCF_3$, particularly preferably F or Cl and very particularly preferably F.

The concentration of component A in the medium is preferably in the range from 1% to 25%, more preferably from 2% to 15%, even more preferably from 2% to 10% and very preferably from 3% to 10%. If a single homologous compound of the formula I is used in the medium, its concentration is preferably in the range from 1% to 10%; if two or more homologous compounds of the formula I are used in the medium, 1% to 8% of the individual homologues are preferably used.

The media in accordance with the present invention preferably comprise a further (for example second) dielectrically positive component, component B. This further dielectrically positive component, component B, preferably comprises, more preferably predominantly consists of, even more preferably essentially consists of and very preferably completely consists of dielectrically positive compounds having a dielectric anisotropy of greater than 3.

This component, component B, preferably comprises, more preferably predominantly consists of, even more preferably essentially consists of and very preferably completely consists of one or more dielectrically positive compounds having a dielectric anisotropy of greater than 3, selected from the group of the formulae II and III.

In a preferred embodiment of the present invention, component B comprises, more preferably predominantly consists of, even more preferably essentially consists of and very preferably completely consists of one or more dielectrically positive compounds having a dielectric anisotropy of greater than 3, selected from the group of the compounds of the formulae II-1 to II-3:

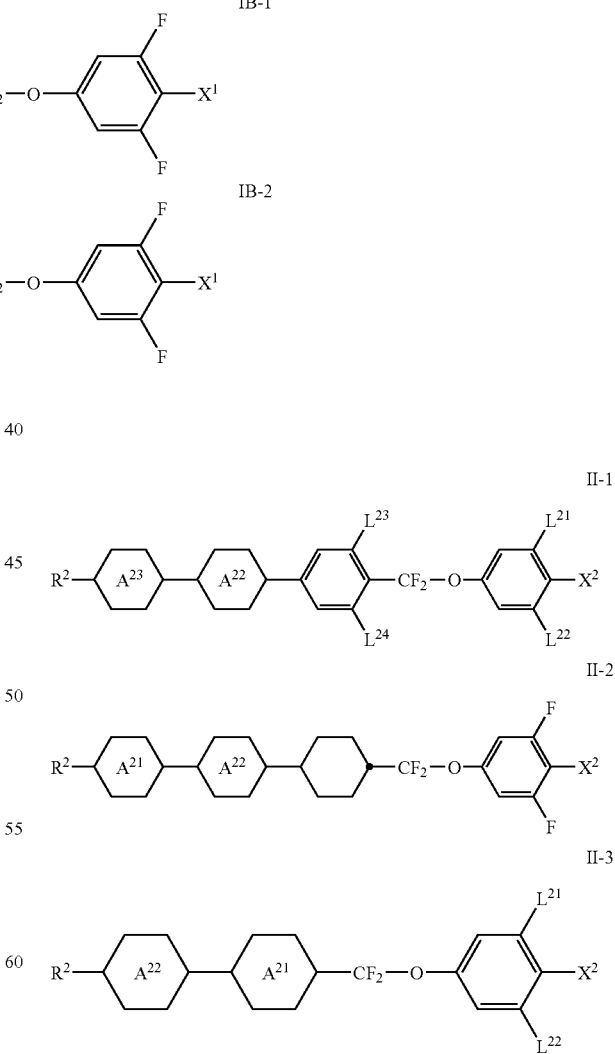

in which the parameters have the respective meanings indicated above under formula II, and in formula II-1 the parameters $L^{23}$ and $L^{24}$, independently of one another and of the other parameters, denote H or F, and in formula II-2,

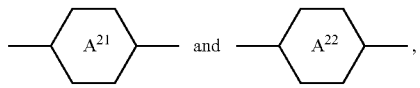

independently of one another, preferably denote

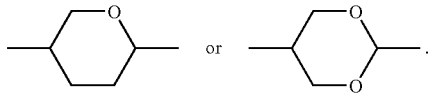

Component B preferably comprises compounds selected from the group of the compounds of the formulae II-1 to II-3 in which $L^{21}$ and $L^{22}$ or $L^{23}$ and $L^{24}$ both denote F.

In a preferred embodiment, component B comprises compounds selected from the group of the compounds of the formulae II-1 and II-2 in which $L^{21}$, $L^{22}$, $L^{23}$ and $L^{24}$ all denote F.

Component B preferably comprises one or more compounds of the formula II-1. The compounds of the formula II-1 are preferably selected from the group of the compounds of the formulae II-1a to II-1j:

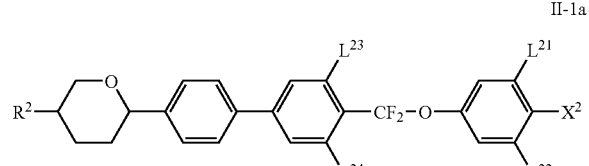

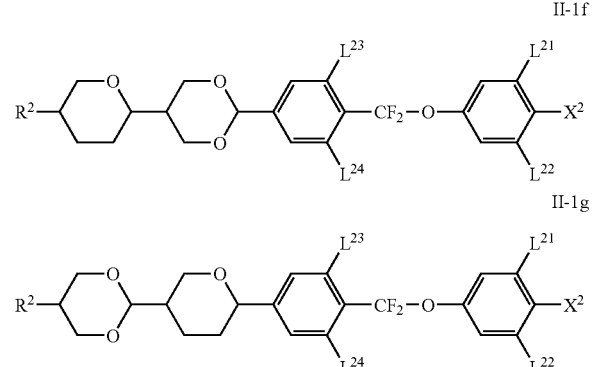

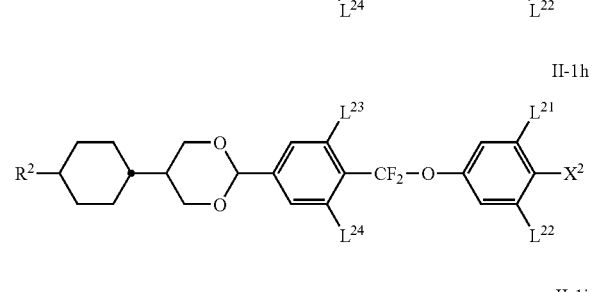

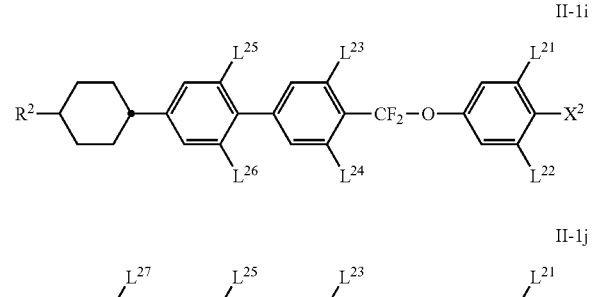

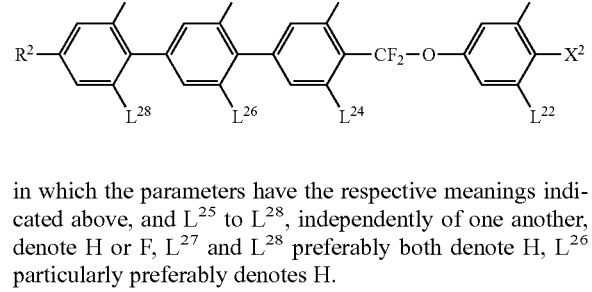

in which the parameters have the respective meanings indicated above, and $L^{25}$ to $L^{28}$, independently of one another, denote H or F, $L^{27}$ and $L^{28}$ preferably both denote H, $L^{26}$ particularly preferably denotes H.

Component B preferably comprises compounds selected from the group of the compounds of the formulae II-1a to II-1e in which $L^{21}$ and $L^{22}$ both denote F and/or $L^{23}$ and $L^{24}$ both denote F.

In a preferred embodiment, component B comprises compounds selected from the group of the compounds of the formulae II-1a to II-1h in which $L^{21}$, $L^{22}$, $L^{23}$ and $L^{24}$ all denote F.

Especially preferred compounds of the formula II-1 are

-continued

II-1c-1
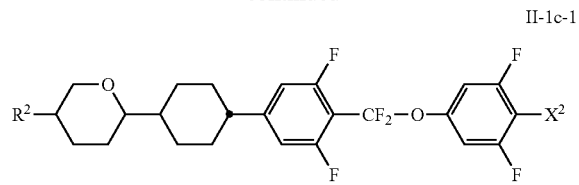

II-1d-1
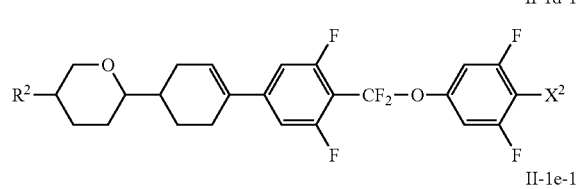

II-1e-1
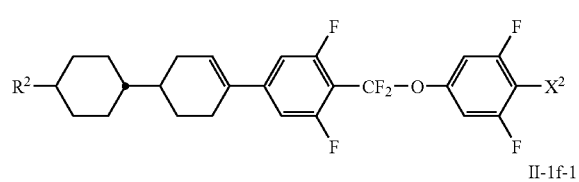

II-1f-1
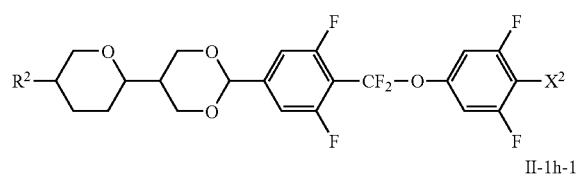

II-1h-1
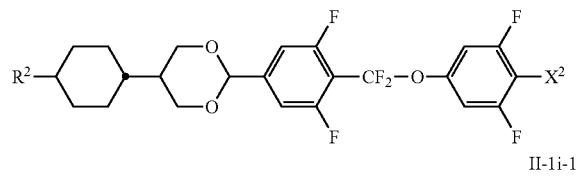

II-1i-1
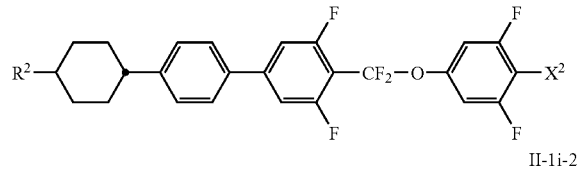

II-1i-2
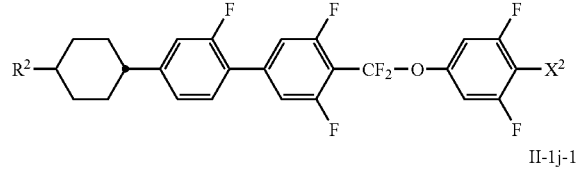

II-1j-1
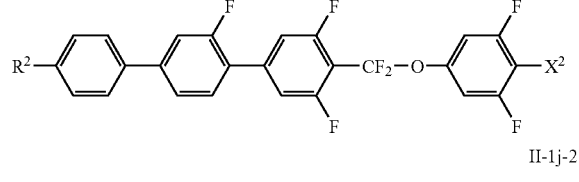

II-1j-2
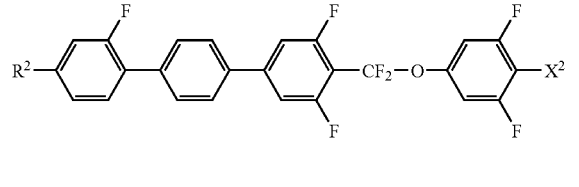

in which $R^2$ and $X^2$ have the meanings indicated above, and $X^2$ preferably denotes F.

Component B preferably comprises one or more compounds of the formula II-2. The compounds of the formula II-2 are preferably selected from the group of the compounds of the formulae II-2a to II-2c:

II-2a
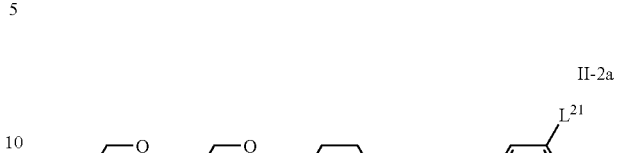

II-2b
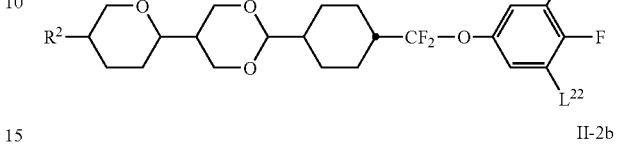

II-2c
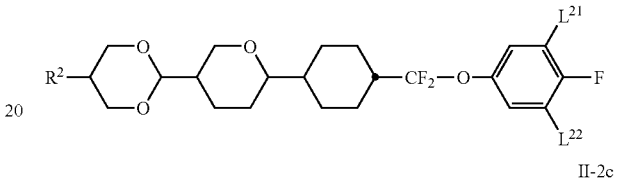

in which the parameters have the respective meanings indicated above, and $L^{21}$ and $L^{22}$ preferably both denote F.

Component B preferably comprises one or more compounds of the formula II-3. The compounds of the formula II-3 are preferably selected from the group of the compounds of the formulae II-3a to II-3e:

II-3a
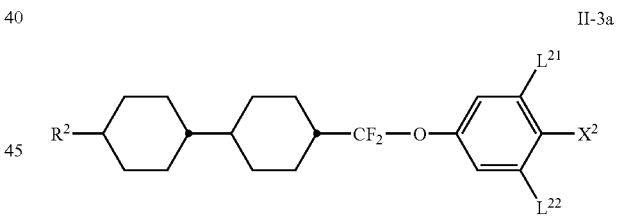

II-3b
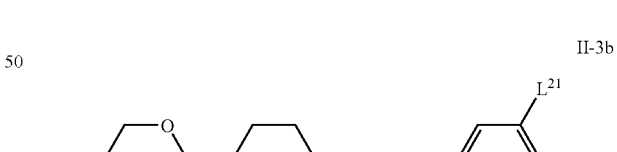

II-3c
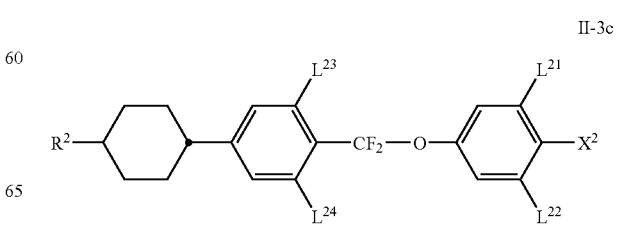

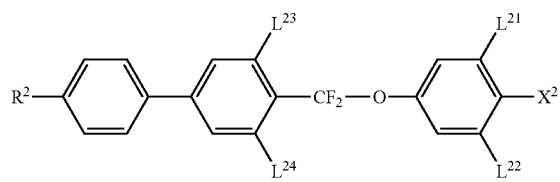

II-3d

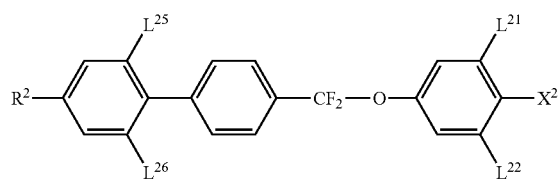

II-3e in which the parameters have the respective meanings indicated above, and $L^{25}$ and $L^{26}$, independently of one another and of the other parameters, denote H or F, and preferably in the formulae II-3a and II-3b $L^{21}$ and $L^{22}$ both denote F, in the formulae II-3c and II-3d $L^{21}$ and $L^{22}$ both denote F and/or $L^{23}$ and $L^{24}$ both denote F, and in formula II-3e $L^{21}$, $L^{22}$ and $L^{23}$ denote F.

Especially preferred compounds of the formula II-3 are

II-3a-1

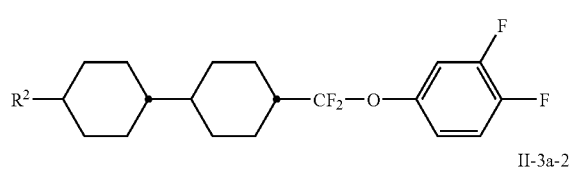

II-3a-2

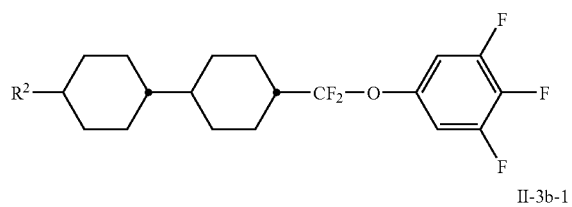

II-3b-1

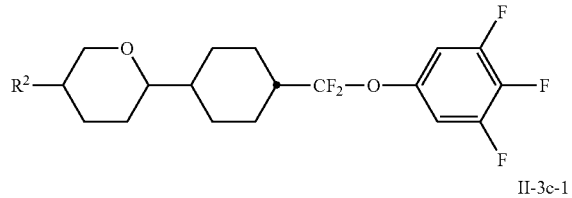

II-3c-1

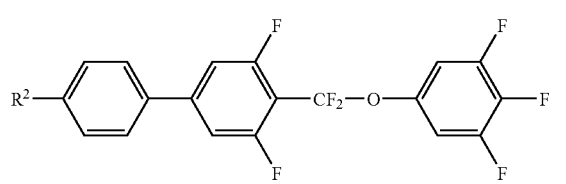

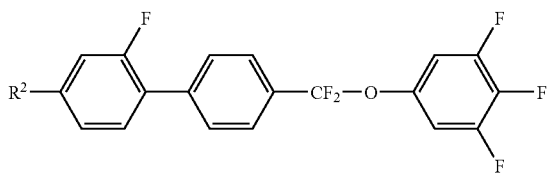

II-3e-2 in which $R^2$ has the meaning indicated above.

In a further preferred embodiment of the present invention, component B comprises, more preferably predominantly consists of, even more preferably essentially consists of and very preferably completely consists of one or more dielectrically positive compounds having a dielectric anisotropy of greater than 3, selected from the group of the formulae III-1 and III-2:

III-1

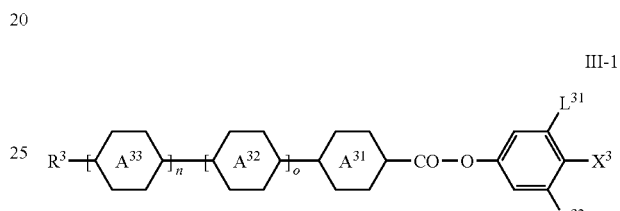

III-2

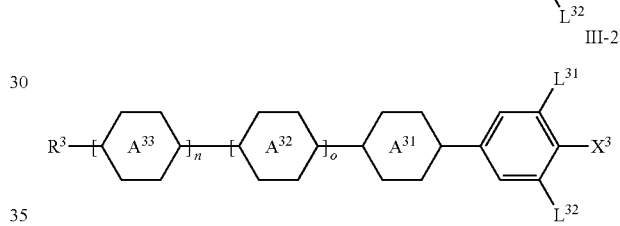

in which the parameters have the respective meanings indicated above under formula III.

Component B preferably comprises one or more compounds of the formula III-1. The compounds of the formula III-1 are preferably selected from the group of the compounds of the formulae III-1a and III-1b:

III-1a

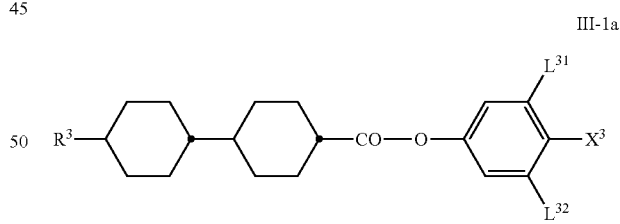

III-1b

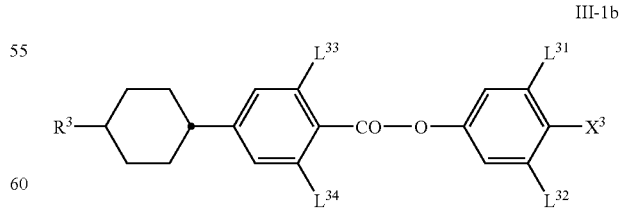

in which the parameters have the respective meanings indicated above, and the parameters $L^{33}$ and $L^{34}$, independently of one another and of the other parameters, denote H or F.

Component B preferably comprises one or more compounds of the formula III-2. The compounds of the formula III-2 are preferably selected from the group of the compounds of the formulae III-2a to III-2h:

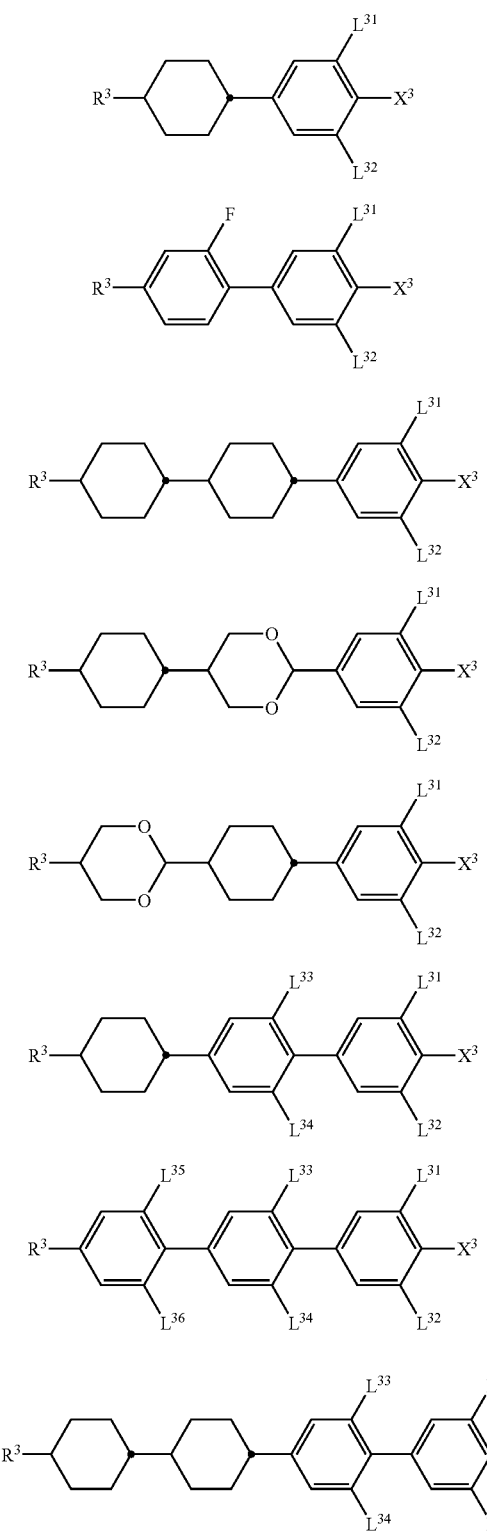

in which the parameters have the respective meanings indicated above, and the parameters $L^{35}$ and $L^{36}$, independently of one another and of the other parameters, denote H or F.

Component B preferably comprises one or more compounds of the formula III-1a, which are preferably selected from the group of the compounds of the formulae III-1a-1 to III-1a-6:

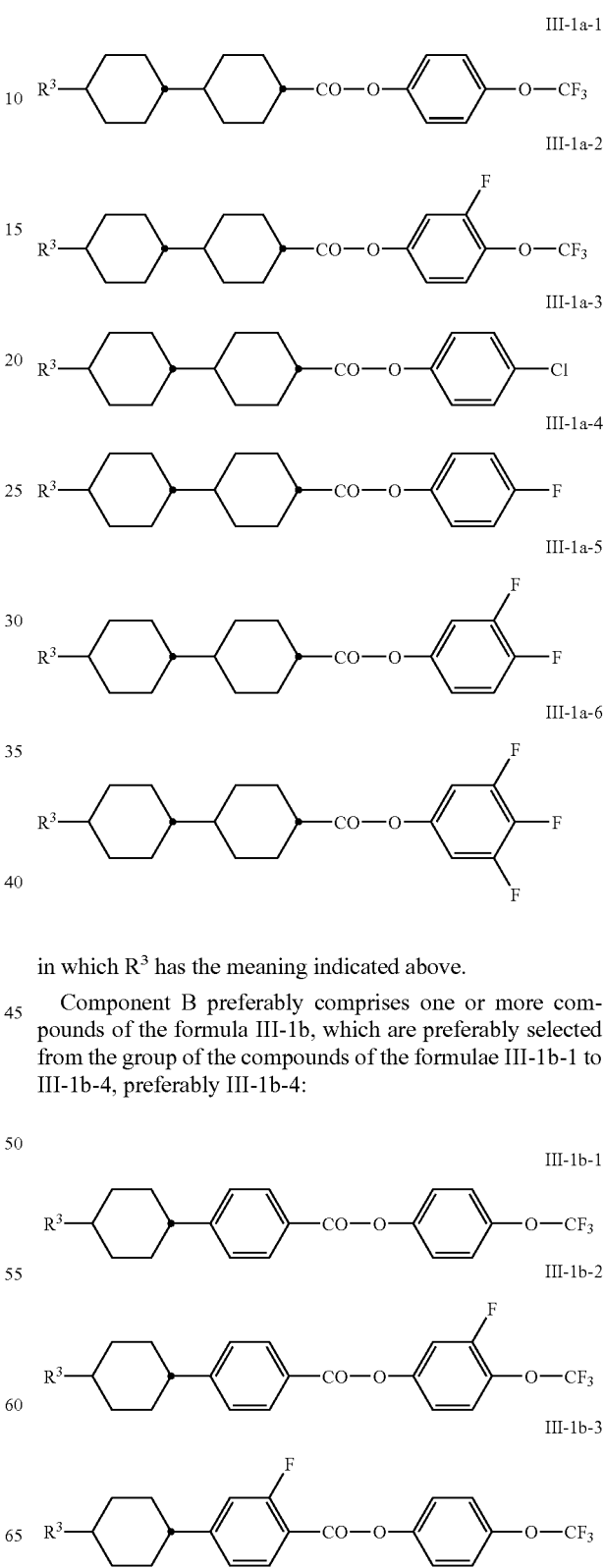

in which $R^3$ has the meaning indicated above.

Component B preferably comprises one or more compounds of the formula III-1b, which are preferably selected from the group of the compounds of the formulae III-1b-1 to III-1b-4, preferably III-1b-4:

-continued

III-1b-4

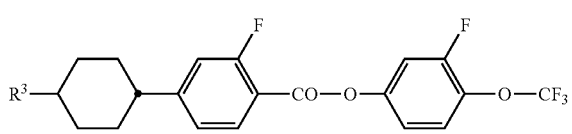

in which R³ has the meaning indicated above.

Component B preferably comprises one or more compounds of the formula III-2a, which are preferably selected from the group of the compounds of the formulae III-2a-1 to III-2a-5:

III-2a-1
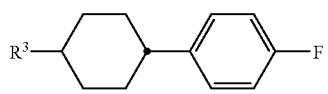

III-2a-2
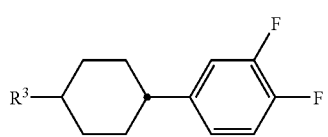

III-2a-3
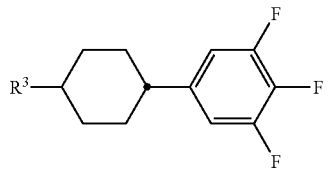

III-2a-4
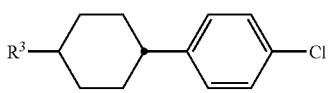

III-2a-5
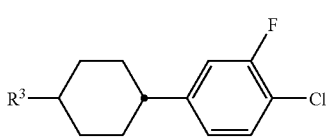

in which R³ has the meaning indicated above.

Component B preferably comprises one or more compounds of the formula III-2b, which are preferably selected from the group of the compounds of the formulae III-2b-1 and III-2b-2, preferably III-2b-2:

III-2b-1
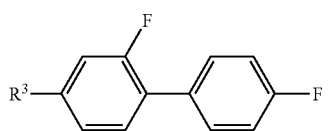

III-2b-2
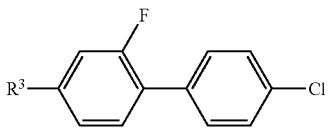

in which R³ has the meaning indicated above.

Component B preferably comprises one or more compounds of the formula III-2c, which are preferably selected from the group of the compounds of the formulae III-2c-1 to III-2c-5:

III-2c-1
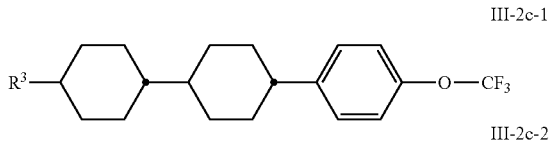

III-2c-2
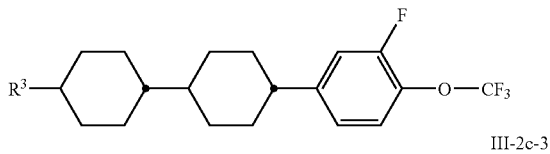

III-2c-3
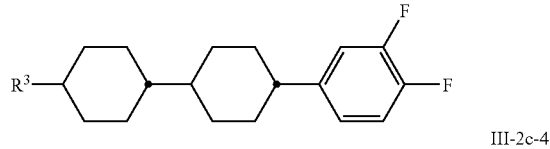

III-2c-4
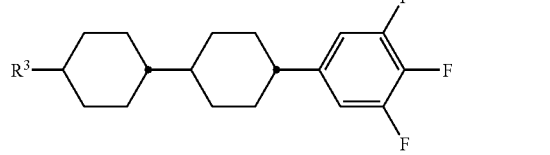

III-2c-5
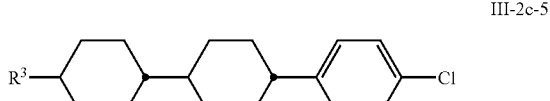

in which R³ has the meaning indicated above.

Component B preferably comprises one or more compounds selected from the group of the compounds of the formulae III-2d and III-2e, which are preferably selected from the group of the compounds of the formulae III-2d-1 and III-2e-1:

III-2d-1
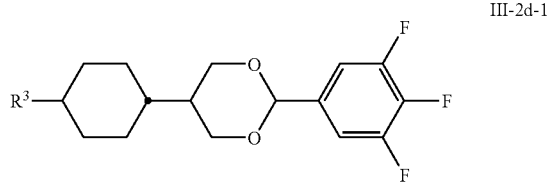

III-2e-1
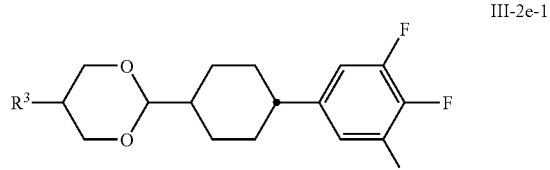

in which R³ has the meaning indicated above.

Component B preferably comprises one or more compounds of the formula III-2f, which are preferably selected from the group of the compounds of the formulae III-2f-1 to III-2f-5:

III-2f-1
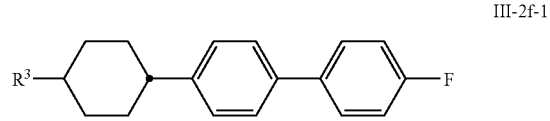

-continued

III-2f-2
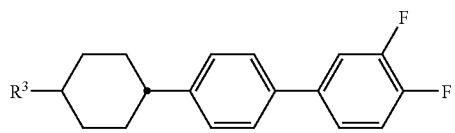

III-2f-3
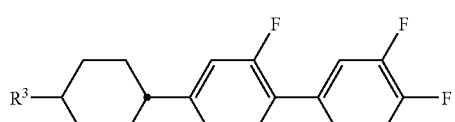

III-2f-4
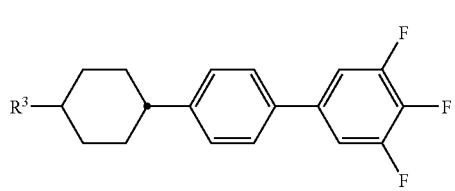

III-2f-5
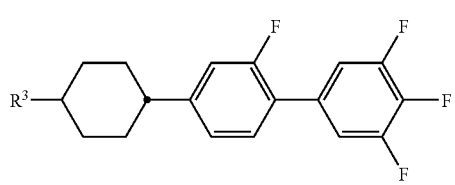

in which R³ has the meaning indicated above.

Component B preferably comprises one or more compounds of the formula III-2g, which are preferably selected from the group of the compounds of the formulae III-2g-1 to III-2g-5:

III-2g-1
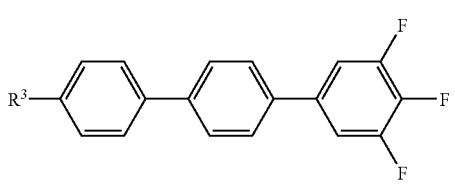

III-2g-2
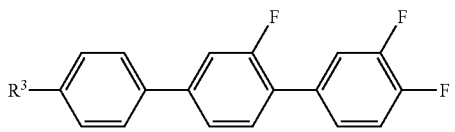

III-2g-3
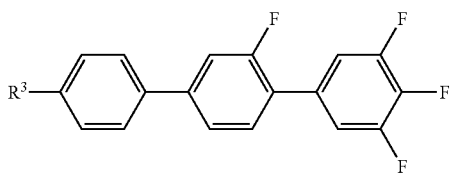

III-2g-4
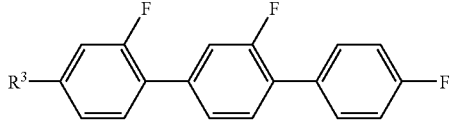

-continued

III-2g-5
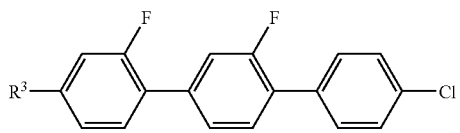

in which R³ has the meaning indicated above.

Component B preferably comprises one or more compounds of the formula III-2h, which are preferably selected from the group of the compounds of the formulae III-2h-1 to III-2h-6:

III-2h-1
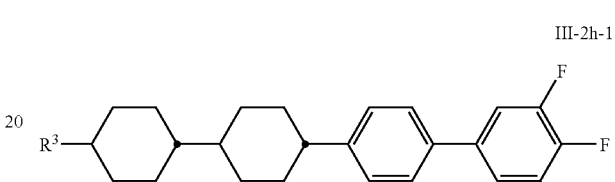

III-2h-2
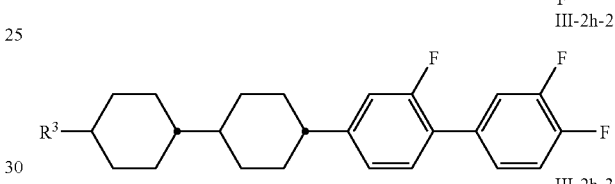

III-2h-3
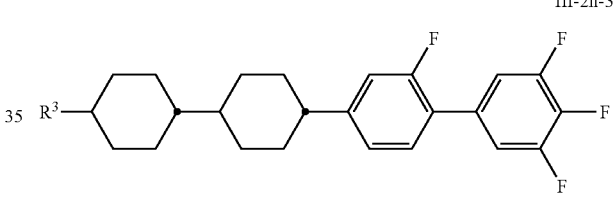

III-2h-4
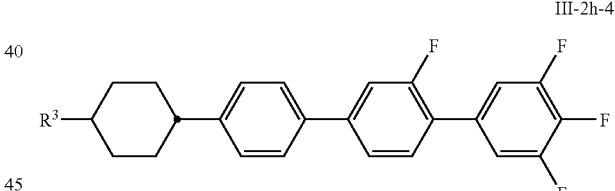

III-2h-5
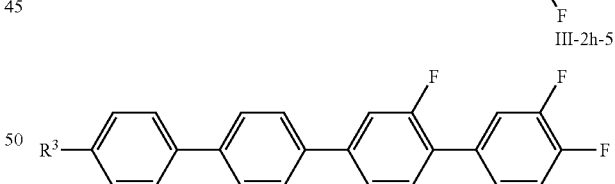

III-2h-6
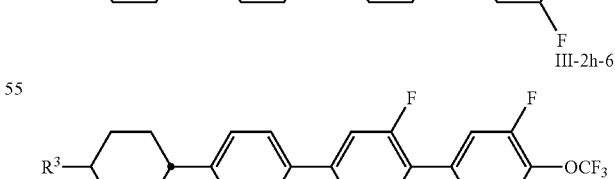
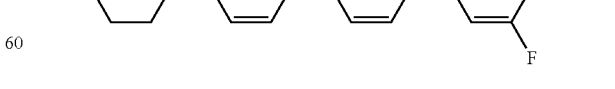
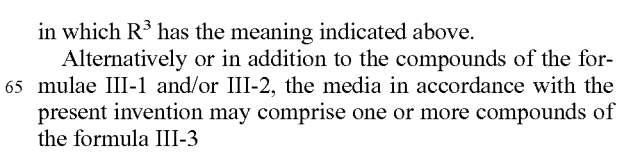

in which R³ has the meaning indicated above.

Alternatively or in addition to the compounds of the formulae III-1 and/or III-2, the media in accordance with the present invention may comprise one or more compounds of the formula III-3

III-3

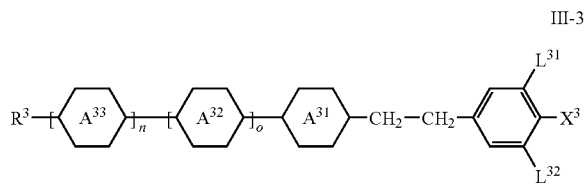

in which the parameters have the respective meanings indicated above under formula III and are preferably selected from the group of the formulae III-3a and III-3b:

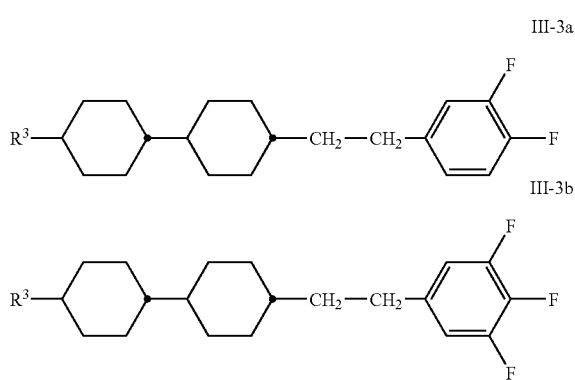

in which $R^3$ has the meaning indicated above.

The liquid-crystalline media in accordance with the present invention preferably comprise a dielectrically neutral component, component C. This component has a dielectric anisotropy in the range from −1.5 to 3. It preferably comprises, more preferably predominantly consists of, even more preferably essentially consists of and especially preferably completely consists of dielectrically neutral compounds having a dielectric anisotropy in the range from −1.5 to 3. This component preferably comprises, more preferably predominantly consists of, even more preferably essentially consists of and very preferably completely consists of one or more dielectrically neutral compounds having a dielectric anisotropy in the range from −1.5 to 3, of the formula IV.

The dielectrically neutral component, component C, preferably comprises one or more compounds selected from the group of the compounds of the formulae IV-1 to IV-6:

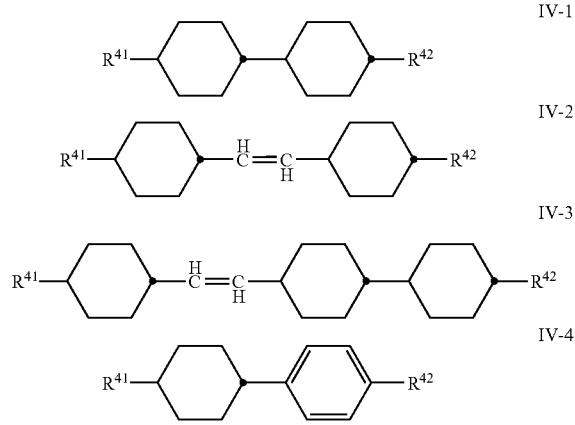

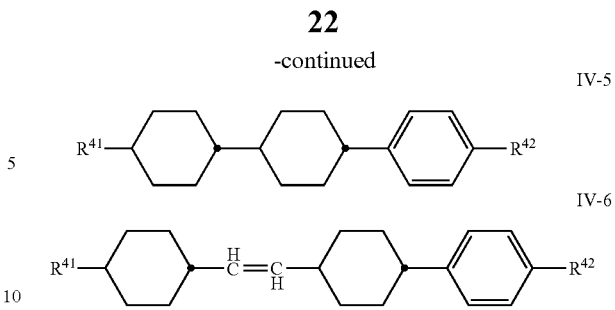

in which $R^{41}$ and $R^{42}$ have the respective meanings indicated above under formula IV, and in the formulae IV-1, IV-5 and IV-6 $R^{41}$ preferably denotes alkyl or alkenyl, preferably alkenyl, and $R^{42}$ preferably denotes alkyl or alkenyl, preferably alkyl, in formula IV-2 $R^{41}$ and $R^{42}$ preferably denote alkyl, and in formula IV-4 $R^{41}$ preferably denotes alkyl or alkenyl, more preferably alkyl, and $R^{42}$ preferably denotes alkyl or alkoxy, more preferably alkoxy.

The dielectrically neutral component, component C, preferably comprises one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably in each case one or more compounds of the formulae IV-1, IV-4 and IV-5 and very preferably in each case one or more compounds of the formulae IV-1, IV-4, IV-5 and IV-6.

In a preferred embodiment, component C preferably comprises one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) are indicated below in Table D or are evident from Tables A to C.

In a likewise preferred embodiment, component C preferably comprises one or more compounds of the formula IV-1, more preferably selected from the respective sub-formulae thereof of the formulae CC-n-m, CC-n-V and/or CC-n-Vm, more preferably of the formulae CC-n-V and/or CC-n-Vm and very preferably selected from the group of the formulae CC-3-V, CC-4-V, CC-5-V, CC-3-V1, CC-4-V1, CC-5-V1 and CC-3-V2. The definitions of these abbreviations (acronyms) are likewise indicated below in Table D or are evident from Tables A to C.

In a further preferred embodiment of the present invention, which may be the same as the above embodiment or a different embodiment, the liquid-crystal mixtures in accordance with the present invention comprise component C, which comprises, preferably predominantly consists of and very preferably completely consists of compounds of the formula IV selected from the group of the compounds of the formulae IV-1 to IV-6 as indicated above and optionally of the formulae IV-7 to IV-13:

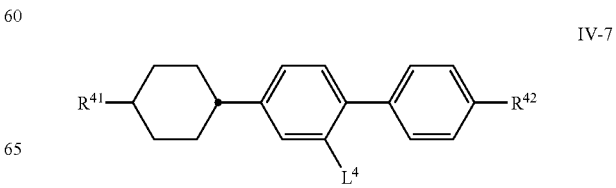

-continued

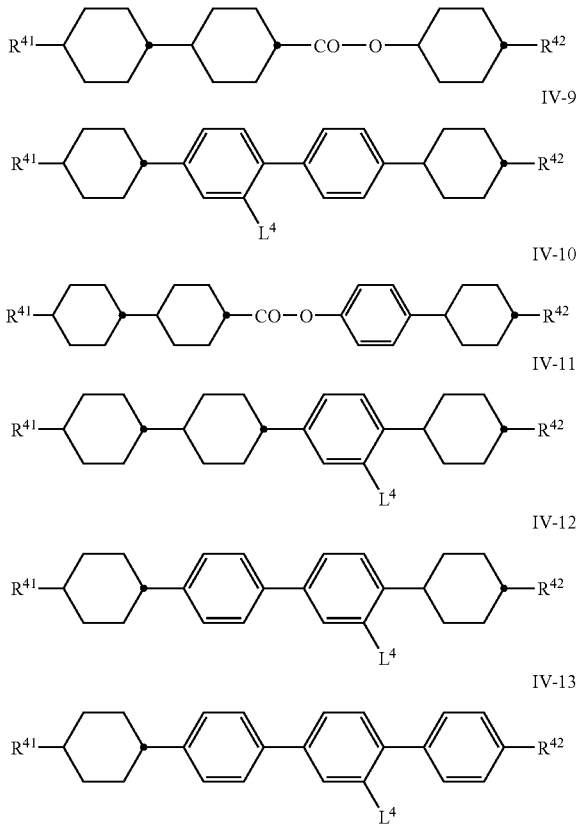

in which

R⁴¹ and R⁴², independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and L⁴ denotes H or F.

In a preferred embodiment, component C preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are indicated below in Table D or are evident from Tables A to C.

Alternatively or in addition to the compounds of the formulae II and/or III, the media in accordance with the present invention may comprise one or more dielectrically positive compounds of the formula V

V

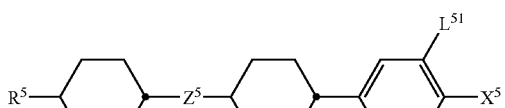

in which

R⁵ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

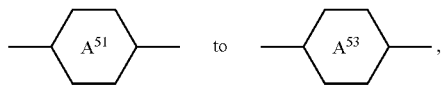

independently of one another, denote

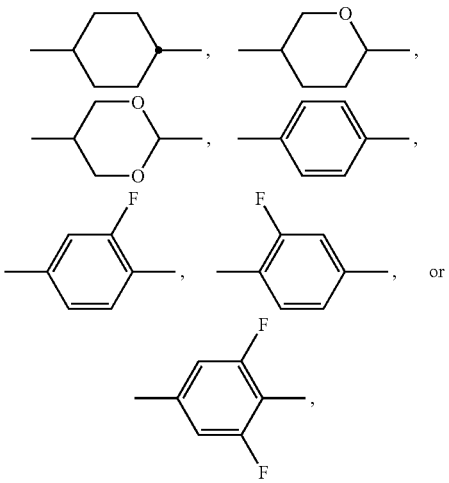

L⁵¹ and L⁵², independently of one another, denote H or F, preferably L⁵¹ denotes F, and X⁵ denotes halogen, halogenated alkyl or alkoxy having 1 to 3 C atoms or halogenated alkenyl or alkenyloxy having 2 or 3 C atoms, preferably F, Cl, —OCF₃ or —CF₃, very preferably F, Cl or —OCF₃, Z⁵ denotes —CH₂CH₂—, —CF₂CF₂—, —COO—, trans-CH=CH—, trans-CF=CF— or —CH₂O—, preferably —CH₂CH₂—, —COO— or trans-CH=CH— and very preferably —COO— or trans-CH=CH—, and q denotes 0 or 1.

The media in accordance with the present invention preferably comprise one or more compounds of the formula V, preferably selected from the group of the compounds of the formulae V-1 and V-2:

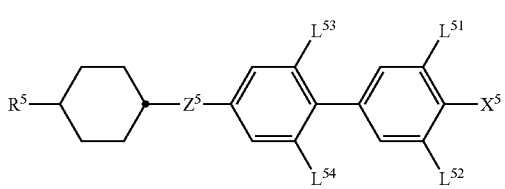

in which the parameters have the respective meanings indicated above, and the parameters $L^{53}$ and $L^{54}$, independently of one another and of the other parameters, denote H or F, and $Z^5$ preferably denotes —CH$_2$—CH$_2$—.

The compounds of the formula V-1 are preferably selected from the group of the compounds of the formulae V-1a and V-1b:

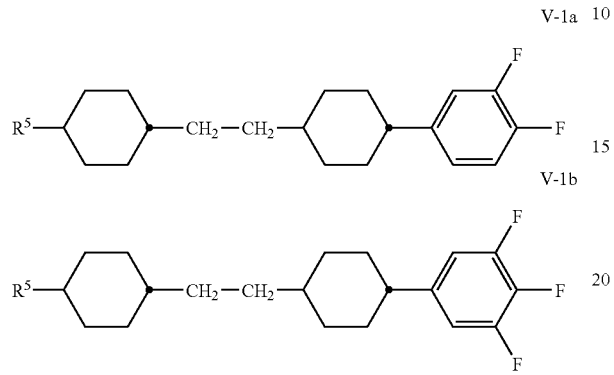

in which $R^5$ has the meaning indicated above.

The compounds of the formula V-2 are preferably selected from the group of the compounds of the formulae V-2a to V-2d:

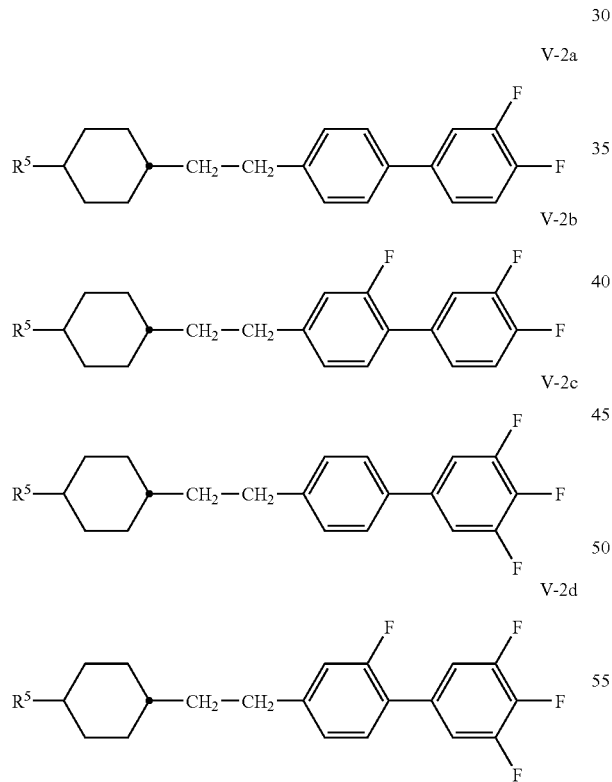

in which $R^5$ has the meaning indicated above.

The liquid-crystalline media in accordance with the present invention preferably comprise an additional dielectrically neutral component, component D. This component has a dielectric anisotropy in the range from −1.5 to 3. It preferably comprises, more preferably predominantly consists of, even more preferably essentially consists of and especially preferably completely consists of dielectrically neutral compounds having a dielectric anisotropy in the range from −1.5 to 3. This component preferably comprises, more preferably predominantly consists of, even more preferably essentially consists of and very preferably completely consists of one or more dielectrically neutral compounds having a dielectric anisotropy in the range from −1.5 to 3, of the formula VI

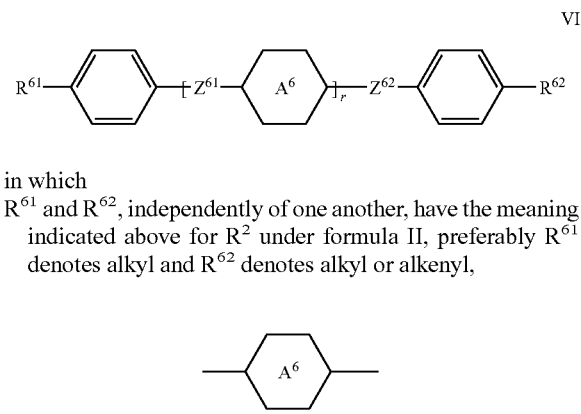

in which
$R^{61}$ and $R^{62}$, independently of one another, have the meaning indicated above for $R^2$ under formula II, preferably $R^{61}$ denotes alkyl and $R^{62}$ denotes alkyl or alkenyl,

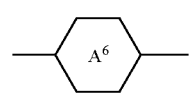

and, if it occurs twice, independently of one another on each occurrence, denotes

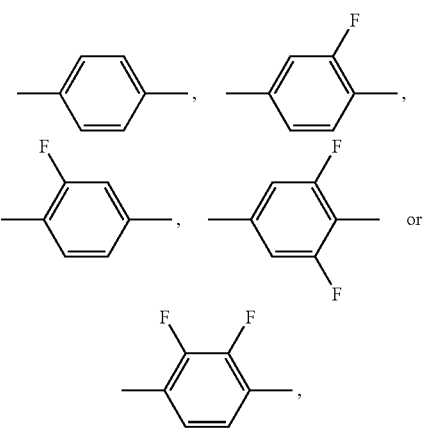

preferably one or more of

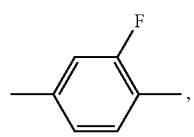

denotes/denote $Z^{61}$ and $Z^{62}$, independently of one another and, if $Z^{61}$ occurs twice, also these independently of one another, denote —CH$_2$CH$_2$—, —COO—, trans-CH═CH—, trans- CF=CF—, —CH$_2$O—, —CF$_2$O— or a single bond, preferably one or more thereof denotes/denote a single bond, and r denotes 0, 1 or 2, preferably 0 or 1.

The dielectrically neutral component, component D, preferably comprises one or more compounds selected from the group of the compounds of the formulae VI-1 and VI-2:

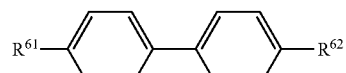
VI-1

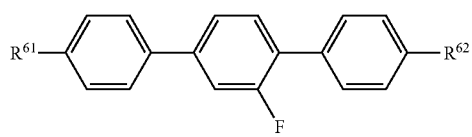
VI-2 in which R$^{61}$ and R$^{62}$ have the respective meanings indicated above under formula VI, and R$^{61}$ preferably denotes alkyl, and in formula VI-1 R$^{62}$ preferably denotes alkenyl, preferably —(CH$_2$)$_2$—CH=CH—CH$_3$, and in formula VI-2 R$^{62}$ preferably denotes alkyl.

The dielectrically neutral component, component D, preferably comprises one or more compounds selected from the group of the compounds of the formulae VI-1 and VI-2 in which R$^{61}$ preferably denotes n-alkyl, and in formula VI-1 R$^{62}$ preferably denotes alkenyl, and in formula VI-2 R$^{62}$ preferably denotes n-alkyl.

In a preferred embodiment, component D preferably comprises one or more compounds of the formula VI-1, more preferably of the sub-formula PP-n-2Vm thereof, even more preferably of the formula PP-1-2V1. The definitions of these abbreviations (acronyms) are indicated below in Table D or are evident from Tables A to C.

In a preferred embodiment, component D preferably comprises one or more compounds of the formula VI-2, more preferably of the sub-formula PGP-n-m thereof, even more preferably of the sub-formula PGP-3-m thereof, very preferably selected from the formulae PGP-3-2, PGP-3-3, PGP-3-4 and PGP-3-5. The definitions of these abbreviations (acronyms) are likewise indicated below in Table D or are evident from Tables A to C.

Besides components A and B, the liquid-crystal mixtures in accordance with the present invention preferably comprise at least one further component. This third component can be one of components C and D, the third component present is preferably component C.

The mixtures in accordance with the present invention may of course also comprise all four components A, B, C and D and indeed do so in a preferred embodiment.

In addition, the liquid-crystal mixtures in accordance with the present invention may comprise a further optional component, component E, which has positive dielectric anisotropy and comprises, preferably predominantly consists of, more preferably essentially consists of and very preferably completely consists of dielectrically positive compounds, preferably of the formula VII

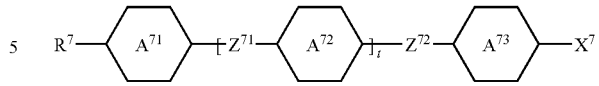
VII in which

R$^7$ has the meaning indicated above for R$^2$ under formula II, one of

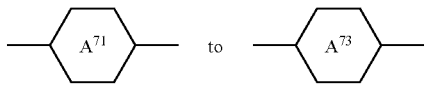

which is present denotes

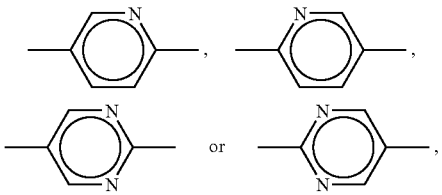

preferably

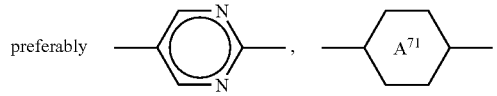

preferably denotes

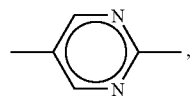

and the others have the same meaning or, independently of one another, denote

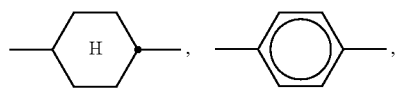

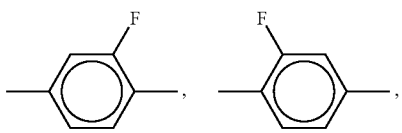

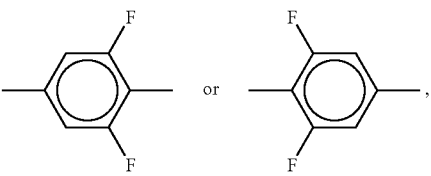

preferably

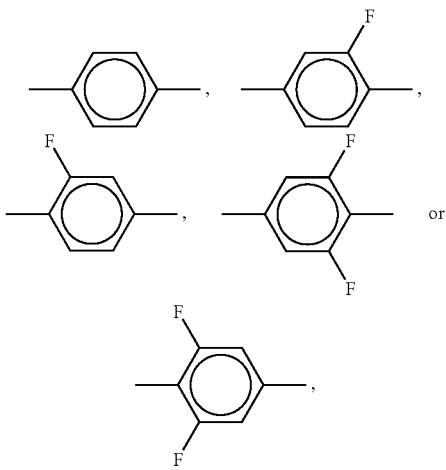

$Z^{71}$ and $Z^{72}$ independently of one another, denote —CH$_2$CH$_2$—, —COO—, trans-CH=CH—, trans-CF=CF—, —CH$_2$O—, —CF$_2$O— or a single bond, preferably one or more thereof denotes/denote a single bond and very preferably both denote a single bond, t denotes 0, 1 or 2, preferably 0 or 1, more preferably 1, and $X^7$ has the meaning indicated above for $X^2$ under formula II or alternatively, independently of $R^8$, can have the meaning indicated for $R^8$, and wherefrom the compounds of the formula I are excluded.

The liquid-crystalline media in accordance with the present invention preferably comprise, more preferably predominantly consist of, even more preferably essentially consist of and very preferably completely consist of components A to E, preferably A to D and very preferably A to C, and in particular compounds selected from the group of the compounds of the formulae I to VII, preferably I to V and very preferably I to III and/or IV.

In this application, comprise in connection with compositions means that the entity in question, i.e. the medium or the component, comprises the component or components or compound or compounds indicated, preferably in a total concentration of 10% or more and very preferably 20% or more.

In this connection, predominantly consist of means that the entity in question comprises 55% or more, preferably 60% or more and very preferably 70% or more of the component or components or compound or compounds indicated.

In this connection, essentially consist of means that the entity in question comprises 80% or more, preferably 90% or more and very preferably 95% or more of the component or components or compound or compounds indicated.

In this connection, completely consist of means that the entity in question comprises 98% or more, preferably 99% or more and very preferably 100.0% of the component or components or compound or compounds indicated.

Other mesogenic compounds which are not explicitly mentioned above may also optionally and advantageously be used in the media in accordance with the present invention. Such compounds are known to the person skilled in the art.

The liquid-crystal media in accordance with the present invention preferably have a clearing point of 60° C. or more, particularly preferably 70° C. or more and very particularly preferably 75° C. or more.

The Δn of the liquid-crystal media in accordance with the present invention at 589 nm (Na$^D$) and 20° C. is preferably in the range from 0.060 or more to 0.200 or less, more preferably in the range from 0.070 or more to 0.180 or less, even more preferably in the range from 0.080 or more to 0.170 or less and very preferably in the range from 0.100 or more to 0.165 or less.

In a preferred embodiment of the present application, the Δn of the liquid-crystal media in accordance with the present invention is preferably 0.080 or more, more preferably 0.090 or more.

The Δε of the liquid-crystal medium in accordance with the invention at 1 kHz and 20° C. is preferably 2 or more, more preferably 4 or more and very preferably 5 or more. In particular, Δε is 21 or less.

The nematic phase of the media according to the invention preferably extends at least from 0° C. or less to 70° C. or more, more preferably at least from −20° C. or less to 70° C. or more, very preferably at least from −30° C. or less to 75° C. or more and in particular at least from −40° C. or less to 75° C. or more.

In a first preferred embodiment of the present invention, the Δn of the liquid-crystal media is in the range from 0.120 or more to 0.150 or less, more preferably in the range from 0.125 or more to 0.145 or less and very preferably in the range from 0.130 or more to 0.140 or less. In this embodiment, Δε is preferably in the range from 2 or more to 8 or less, particularly preferably in the range from 3 or more to 7 or less and very particularly preferably in the range from 4 or more to 6 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 70° C. or more.

In a second preferred embodiment of the present invention, the Δn of the liquid-crystal media is in the range from 0.110 or more to 0.140 or less, more preferably in the range from 0.115 or more to 0.135 or less and very preferably in the range from 0.120 or more to 0.130 or less.

In this embodiment, Δε is preferably in the range from 6 or more to 12 or less, particularly preferably in the range from 7 or more to 11 or less and very particularly preferably in the range from 8.0 or more to 9.5 or less.

In this embodiment, the nematic phase of the media according to the invention preferably extends at least from −20° C. or less to 70° C. or more, more preferably at least from −20° C. or less to 70° C. or more, very preferably at least from −30° C. or less to 70° C. or more and in particular at least from −40° C. or less to 70° C. or more.

In a third preferred embodiment of the present invention, the Δn of the liquid-crystal media is in the range from 0.090 or more to 0.130 or less, more preferably in the range from 0.100 or more to 0.120 or less and very preferably in the range from 0.1080 or more to 0.1150 or less.

In this embodiment, Δε is preferably in the range from 12 or more to 19 or less, particularly preferably in the range from 14 or more to 17 or less and very particularly preferably in the range from 15 or more to 16 or less.

In this embodiment, the nematic phase of the media according to the invention preferably extends at least from −20° C. or less to 75° C. or more, more preferably at least from −30° C. or less to 70° C. or more, very preferably at least from −30° C. or less to 75° C. or more and in particular at least from −30° C. or less to 80° C. or more.

In a fourth preferred embodiment of the present invention, the Δn of the liquid-crystal media is in the range from 0.140 or more to 0.180 or less, more preferably in the range from 0.150 or more to 0.170 or less and very preferably in the range from 0.155 or more to 0.165 or less.

In this embodiment, $\Delta\epsilon$ is preferably in the range from 11 or more to 18 or less, particularly preferably in the range from 12 or more to 16 or less and very particularly preferably in the range from 13 or more to 15 or less.

In this embodiment, the nematic phase of the media according to the invention preferably extends at least from −20° C. or less to 80° C. or more, more preferably at least from −30° C. or less to 80° C. or more, very preferably at least from −20° C. or less to 90° C. or more and in particular at least from −20° C. or less to 100° C. or more.

In accordance with the present invention, component A is preferably used in a concentration of 1% to 30%, more preferably 1% to 20%, even more preferably 2% to 15% and very preferably 3% to 10% of the mixture as a whole.

Component B is preferably used in a concentration of 2% to 60%, more preferably 3% to 55%, even more preferably 15% to 50% and very preferably 20% to 45% of the mixture as a whole.

Component C is preferably used in a concentration of 0% to 70%, more preferably 10% to 65%, even more preferably 20% to 60% and very preferably 15% to 55% of the mixture as a whole.

Component D is preferably used in a concentration of 0% to 50%, more preferably 1% to 40%, even more preferably 5% to 30% and very preferably 10% to 20% of the mixture as a whole.

Component E is preferably used in a concentration of 0% to 30%, more preferably 0% to 15% and very preferably 1% to 10% of the mixture as a whole.

The media according to the invention may optionally comprise further liquid-crystal compounds in order to adjust the physical properties. Such compounds are known to the person skilled in the art. Their concentration in the media in accordance with the present invention is preferably 0% to 30%, more preferably 0.1% to 20% and very preferably 1% to 15%.

In the first preferred embodiment of the present invention, as mentioned above, component A is preferably used in a concentration of 1% to 20%, more preferably 3% to 15% and very preferably 3% to 8% of the mixture as a whole, while component D is preferably used in a concentration of 1% to 30%, more preferably 5% to 25% and very preferably 5% to 20% of the mixture as a whole.

In this preferred embodiment, the media preferably comprise one or more compounds of the formula VI and very preferably of the formulae VI-1 and/or VI-2.

Especially in the second preferred embodiment of the present invention, as mentioned above, component C preferably comprises one or more compounds of the formula VI, more preferably of the formula VI-1, even more preferably selected from the respective sub-formulae thereof of the formulae CC-n-V and/or CC-n-Vm, more preferably of the formulae CC-n-V1 and/or CC-n-V and very preferably selected from the group of the formulae CC-3-V, CC-4-V, CC-5-V and CC-3-V1. The definitions of these abbreviations (acronyms) are indicated below in Table D.

Further preferred combinations of compounds and the concentrations and concentration ranges in which these compounds are preferably employed arise for the person skilled in the art from the compositions given in the Examples of the present application, in particular from Examples 9 to 11 and 12.

The liquid-crystal media preferably comprise in total 50% to 100%, more preferably 70% to 100% and very preferably 80% to 100% and in particular 90% to 100% of components A, B, C and D, preferably components A, B and C, which in turn comprise, preferably predominantly consist of and very preferably completely consist of one or more of the compounds of the formulae I, II, III, IV, V, VI and VII, preferably of the formulae I, II, III, IV, V and VI.

In the present application, the expression dielectrically positive describes compounds or components where $\Delta\epsilon>3.0$, dielectrically neutral describes those where $-1.5\leqq\Delta\epsilon\leqq3.0$ and dielectrically negative describes those where $\Delta\epsilon<-1.5$. As is determined at a frequency of 1 kHz and at 20° C. The dielectric anisotropy of the respective compound is determined from the results of a solution of 10% of the respective individual compound in a nematic host mixture. If the solubility of the respective compound in the host mixture is less than 10%, the concentration is reduced to 5%. The capacitances of the test mixtures are determined both in a cell having homeotropic alignment and in a cell having homogeneous alignment. The cell thickness of both types of cells is approximately 20 μm. The voltage applied is a rectangular wave having a frequency of 1 kHz and an effective value of typically 0.5 V to 1.0 V, but it is always selected to be below the capacitive threshold of the respective test mixture.

$\Delta\epsilon$ is defined as $(\epsilon_{\|}-\epsilon_{\perp})$, while $\epsilon_{av.}$ is $(\epsilon_{\|}+2\epsilon_{\perp})/3$.

The host mixture used for dielectrically positive compounds is mixture ZLI-4792 and that used for dielectrically neutral and dielectrically negative compounds is mixture ZLI-3086, both from Merck KGaA, Germany. The absolute dielectric constants of the compounds are determined from the change in the respective values of the host mixture on addition of the compounds of interest. The values are extrapolated to a concentration of the compounds of interest of 100%.

Components having a nematic phase at the measurement temperature of 20° C. are measured as such, all others are treated like compounds.

The expression threshold voltage in the present application refers to the optical threshold and is quoted for 10% relative contrast ($V_{10}$), and the expression saturation voltage refers to the optical saturation and is quoted for 90% relative contrast ($V_{90}$), in both cases unless expressly stated otherwise. The capacitive threshold voltage ($V_0$), also called the Freedericks threshold ($V_{Fr}$), is only used if expressly mentioned.

The ranges of the parameters indicated in this application all include the limit values, unless expressly stated otherwise.

The different upper and lower limit values indicated for various ranges of properties in combination with one another give rise to additional preferred ranges.

Throughout this application, the following conditions and definitions apply, unless expressly stated otherwise. All concentrations are quoted in per cent by weight and relate to the respective mixture as a whole, all temperatures are quoted in degrees Celsius and all temperature differences are quoted in differential degrees. All physical properties are determined in accordance with "Merck Liquid Crystals, Physical Properties of Liquid Crystals", Status November 1997, Merck KGaA, Germany, and are quoted for a temperature of 20° C., unless expressly stated otherwise. The optical anisotropy ($\Delta n$) is determined at a wavelength of 589.3 nm. The dielectric anisotropy ($\Delta\epsilon$) is determined at a frequency of 1 kHz. The threshold voltages, as well as all other electro-optical properties, are determined using test cells produced at Merck KGaA, Germany. The test cells for the determination of $\Delta\epsilon$ have a cell thickness of approximately 20 μm. The electrode is a circular ITO electrode having an area of 1.13 cm$^2$ and a guard ring. The orientation layers are SE-1211 from Nissan Chemicals, Japan, for homeotropic orientation ($\epsilon_{\|}$) and polyimide AL-1054 from Japan Synthetic Rubber, Japan, for homogeneous orientation ($\epsilon_{\perp}$). The capacitances are determined using a Solatron 1260 frequency response analyser using a sine wave with a voltage of 0.3 $V_{rms}$. The light used in the electro-optical measurements is white light. A set-up using a commercially available DSM instrument from Autronic-Melchers, Germany, is used here. The characteristic voltages have been determined under perpendicular observation. The threshold ($V_{10}$), mid-grey ($V_{50}$) and saturation ($V_{90}$) voltages have been determined for 10%, 50% and 90% relative contrast respectively.

The liquid-crystal media in accordance with the present invention may comprise further additives and chiral dopants in the usual concentrations. The total concentration of these further constituents is in the range from 0% to 10%, preferably 0.1% to 6%, based on the mixture as a whole. The concentrations of the individual compounds used are each preferably in the range from 0.1% to 3%. The concentration of these and similar additives is not taken into consideration when quoting the values and concentration ranges of the liquid-crystal components and liquid-crystal compounds of the liquid-crystal media in this application.

The liquid-crystal media according to the invention consist of a plurality of compounds, preferably 3 to 30, more preferably 4 to 20 and very preferably 4 to 16 compounds. These compounds are mixed in a conventional manner. In general, the desired amount of the compound used in the smaller amount is dissolved in the compound used in the larger amount. If the temperature is above the clearing point of the compound used in the higher concentration, it is particularly easy to observe completion of the dissolution process. It is, however, also possible to prepare the media in other conventional ways, for example using so-called pre-mixes, which can be, for example, homologous or eutectic mixtures of compounds, or using so-called "multibottle" systems, the constituents of which are themselves ready-to-use mixtures.

By addition of suitable additives, the liquid-crystal media in accordance with the present invention can be modified in such a way that they can be used in all known types of liquid-crystal displays, either using the liquid-crystal media as such, such as TN, TN-AMD, ECB-AMD, VAN-AMD, IPS-AMD, FFS-AMD and OCB-AMD LCDs, or in composite systems, such as PDLC, NCAP, PN LCDs and especially in ASM-PA LCDs.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

In the present invention and especially in the following examples, the structures of the mesogenic compounds are indicated by means of abbreviations, also called acronyms. In these acronyms, the chemical formulae are abbreviated as follows using Tables A to C below. All groups $C_nH_{2n+1}$, $C_mH_{2m+1}$ and $C_lH_{2l+1}$ or $C_nH_{2n-1}$, $C_mH_{2m-1}$ and $C_lH_{2l-1}$ denote straight-chain alkyl or alkenyl, preferably 1E-alkenyl, each having n, m and l C atoms respectively. Table A lists the codes used for the ring elements of the core structures of the compounds, while Table B shows the linking groups. Table C gives the meanings of the codes for the left-hand or right-hand end groups. Table D shows illustrative structures of compounds together with their respective abbreviations.

TABLE A

Ring elements

| | | | | |
|---|---|---|---|---|
| C |  | | | |
| D | 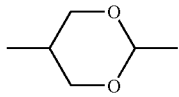 | DI | 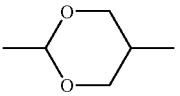 | |
| A | 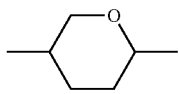 | AI | 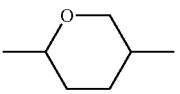 | |
| P | 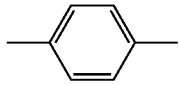 | | | |
| G | 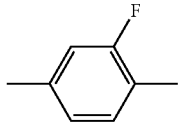 | GI | 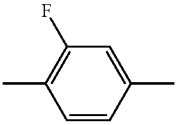 | |
| U | 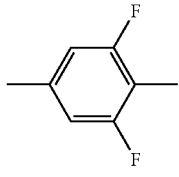 | UI | 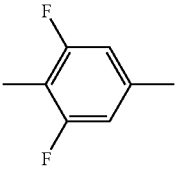 | |
| Y | 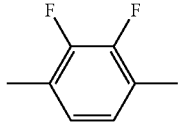 | | | |
| M | 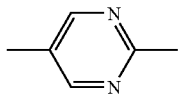 | MI | 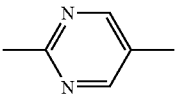 | |
| N | 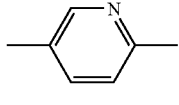 | NI | 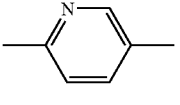 | |
| Np | 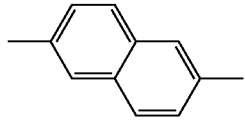 | | | |
| N3f | 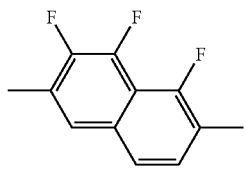 | N3fI |  | |
| tH | 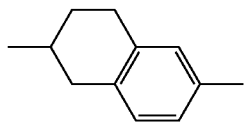 | tHI | 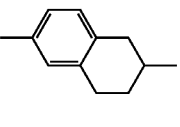 | |

TABLE A-continued

Ring elements

| | | | |
|---|---|---|---|
| tH2f | (structure) | tH2fI | (structure) |
| dH | (structure) | | |
| K | (structure) | KI | (structure) |
| nC | (structure) | nCI | (structure) |
| L | (structure) | LI | (structure) |
| F | (structure) | FI | (structure) |

TABLE B

Linking groups

| | | | |
|---|---|---|---|
| E | —CH$_2$CH$_2$— | Z | —CO—O— |
| V | —CH═CH— | ZI | —O—CO— |
| X | —CF═CH— | O | —CH$_2$—O— |
| XI | —CH═CF— | OI | —O—CH$_2$— |
| B | —CF═CF— | Q | —CF$_2$—O— |
| T | —C≡C— | QI | —O—CF$_2$— |
| W | —CF$_2$CF$_2$— | T | —C≡C— |

TABLE C

End groups

| Left-hand side | | Right-hand side | |
|---|---|---|---|
| Use alone | | | |
| -n- | C$_n$H$_{2n+1}$— | -n | —C$_n$H$_{2n+1}$ |
| -nO- | C$_n$H$_{2n+1}$—O— | -nO | —O—C$_n$H$_{2n+1}$ |
| -V- | CH$_2$═CH— | -V | —CH═CH$_2$ |
| -nV- | C$_n$H$_{2n+1}$—CH═CH— | -nV | —C$_n$H$_{2n}$—CH═CH$_2$ |
| -Vn- | CH$_2$═CH—C$_n$H$_{2n+1}$— | -Vn | —CH═CH—C$_n$H$_{2n+1}$ |
| -nVm- | C$_n$H$_{2n+1}$—CH═CH—C$_m$H$_{2m}$— | -nVm | —C$_n$H$_{2n}$—CH═CH—C$_m$H$_{2m+1}$ |
| -N- | N≡C— | -N | —C≡N |
| -S- | S═C═N— | -S | —N═C═S |
| -F- | F— | -F | —F |
| -CL- | Cl— | -CL | —Cl |
| -M- | CFH$_2$— | -M | —CFH$_2$ |
| -D- | CF$_2$H— | -D | —CF$_2$H |
| -T- | CF$_3$— | -T | —CF$_3$ |
| -MO- | CFH$_2$O— | -OM | —OCFH$_2$ |
| -DO- | CF$_2$HO— | -OD | —OCF$_2$H |
| -TO- | CF$_3$O— | -OT | —OCF$_3$ |
| -OXF- | CF$_2$═CH—O— | -OXF | —O—CH═CF$_2$ |
| -A- | H—C≡C— | -A | —C≡C—H |
| -nA- | C$_n$H$_{2n+1}$—C≡C— | -An | —C≡C—C$_n$H$_{2n+1}$ |
| -NA- | N≡C—C≡C— | -AN | —C≡C—C≡N |
| Use together | | | |
| -...A...- | —C≡C— | -...A... | —C≡C— |
| -...V...- | CH═CH— | -...V... | —CH═CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF═CF— | -...W... | —CF═CF— | in which n and m each denote integers, and the three dots "..." are placeholders for other abbreviations from this table.

The following table shows illustrative structures together with their respective abbreviations. These are shown in order to illustrate the meaning of the rules for the abbreviations. They furthermore represent compounds which are preferably used.

TABLE D

Illustrative structures

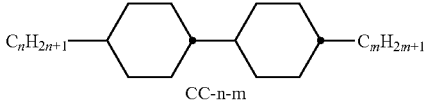
CC-n-m

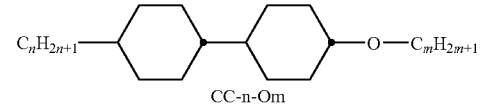
CC-n-Om

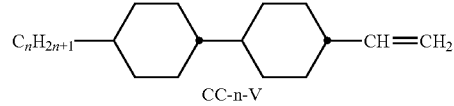
CC-n-V

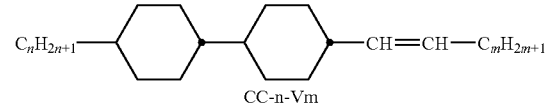
CC-n-Vm

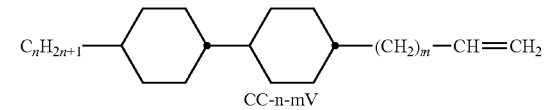
CC-n-mV

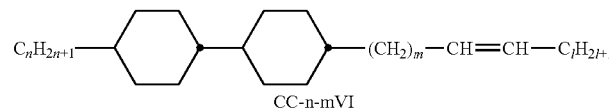
CC-n-mVl

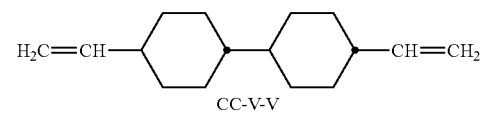
CC-V-V

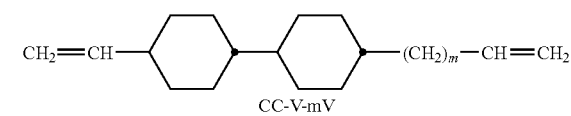
CC-V-mV

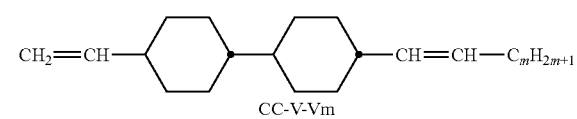
CC-V-Vm

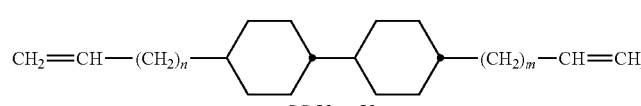
CC-Vn-mV

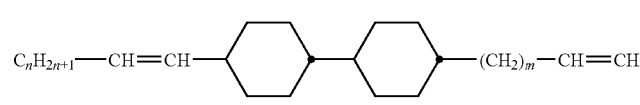
CC-nV-mV

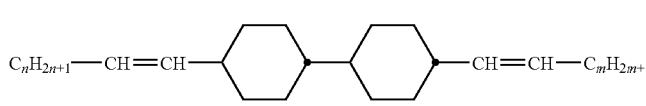
CC-nV-Vm

TABLE D-continued
Illustrative structures
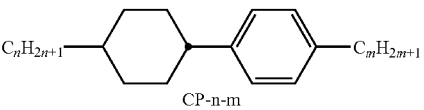
CP-n-m
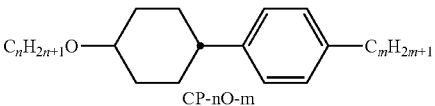
CP-nO-m
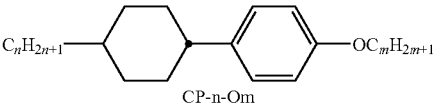
CP-n-Om
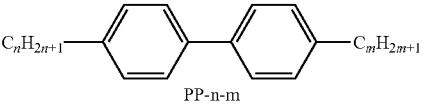
PP-n-m
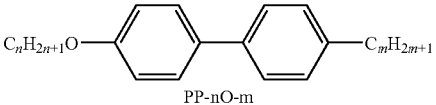
PP-nO-m
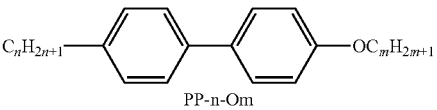
PP-n-Om
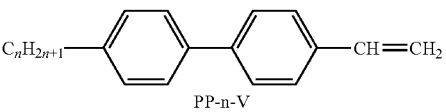
PP-n-V
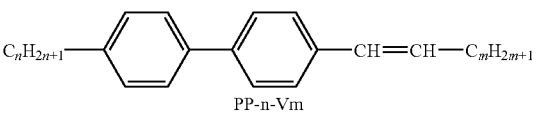
PP-n-Vm
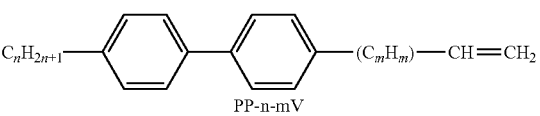
PP-n-mV
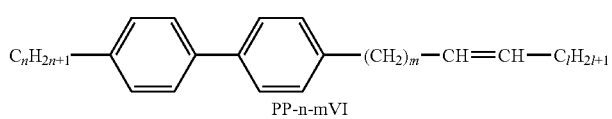
PP-n-mVl
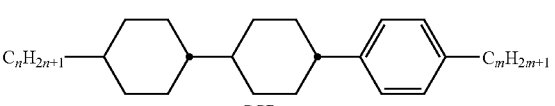
CCP-n-m
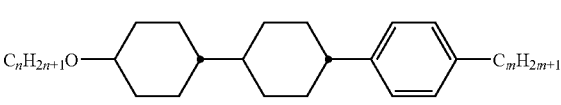
CCP-nO-m
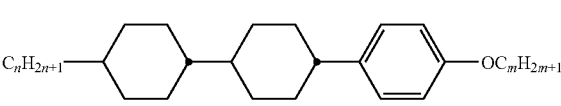
CCP-n-Om TABLE D-continued Illustrative structures $C_nH_{2n+1}$—⟨cyclohexyl⟩—⟨cyclohexyl⟩—⟨phenyl⟩—CH=CH$_2$
CCP-n-V $C_nH_{2n+1}$—⟨cyclohexyl⟩—⟨cyclohexyl⟩—⟨phenyl⟩—CH=CH—$C_mH_{2m+1}$
CCP-n-Vm $C_nH_{2n+1}$—⟨cyclohexyl⟩—⟨cyclohexyl⟩—⟨phenyl⟩—$(C_mH_{2m})$—CH=CH$_2$
CCP-n-mV $C_nH_{2n+1}$—⟨cyclohexyl⟩—⟨cyclohexyl⟩—⟨phenyl⟩—$(C_mH_{2m})$—CH=CH—$C_lH_{2l+1}$
CCP-n-mVl $H_2C$=CH—⟨cyclohexyl⟩—⟨cyclohexyl⟩—⟨phenyl⟩—$C_mH_{2m+1}$
CCP-V-m $C_nH_{2n+1}$—CH=CH—⟨cyclohexyl⟩—⟨cyclohexyl⟩—⟨phenyl⟩—$C_mH_{2m+1}$
CCP-nV-m $CH_2$=CH—$(CH_2)_n$—⟨cyclohexyl⟩—⟨cyclohexyl⟩—⟨phenyl⟩—$C_mH_{2m+1}$
CCP-Vn-m $C_nH_{2n+1}$—CH=CH—$(CH_2)_m$—⟨cyclohexyl⟩—⟨cyclohexyl⟩—⟨phenyl⟩—$C_lH_{2l+1}$
CCP-nVm-l $C_nH_{2n+1}$—⟨cyclohexyl⟩—⟨phenyl⟩—⟨phenyl⟩—$C_mH_{2m+1}$
CPP-n-m $C_nH_{2n+1}$—⟨cyclohexyl⟩—⟨phenyl⟩—⟨phenyl-F⟩—$C_mH_{2m+1}$
CPG-n-m $C_nH_{2n+1}$—⟨cyclohexyl⟩—⟨phenyl-F⟩—⟨phenyl⟩—$C_mH_{2m+1}$
CGP-n-m $C_nH_{2n+1}$O—⟨cyclohexyl⟩—⟨phenyl⟩—⟨phenyl⟩—$C_mH_{2m+1}$
CPP-nO-m TABLE D-continued Illustrative structures $C_nH_{2n+1}$—⟨Cy⟩—⟨Ph⟩—⟨Ph⟩—$OC_mH_{2m+1}$
CPP-n-Om $H_2C=CH$—⟨Cy⟩—⟨Ph⟩—⟨Ph⟩—$C_mH_{2m+1}$
CPP-V-m $C_nH_{2n+1}$—$CH=CH$—⟨Cy⟩—⟨Ph⟩—⟨Ph⟩—$C_mH_{2m+1}$
CPP-nV-m $CH_2=CH$—$(C_nH_{2n})$—⟨Cy⟩—⟨Ph⟩—⟨Ph⟩—$C_mH_{2m+1}$
CPP-Vn-m $C_nH_{2n+1}$—$CH=CH$—$(C_mH_{2m})$—⟨Cy⟩—⟨Ph⟩—⟨Ph⟩—$C_lH_{2l+1}$
CPP-nVm-l $C_nH_{2n+1}$—⟨Ph⟩—⟨Ph(F)⟩—⟨Ph⟩—$C_mH_{2m+1}$
PGP-n-m $C_nH_{2n+1}$—⟨Cy⟩—⟨Ph⟩—⟨Ph⟩—⟨Cy⟩—$C_mH_{2m+1}$
CPPC-n-m $C_nH_{2n+1}$—⟨Cy⟩—⟨Ph(F)⟩—⟨Ph⟩—⟨Cy⟩—$C_mH_{2m+1}$
CGPC-n-m $C_nH_{2n+1}$—⟨Cy⟩—⟨Cy⟩—⟨Ph⟩—⟨Ph⟩—⟨Cy⟩—$C_mH_{2m+1}$
CCPC-n-m $C_nH_{2n+1}$—⟨Cy⟩—⟨Cy⟩—CO—O—⟨Ph⟩—⟨Cy⟩—$C_mH_{2m+1}$
CCZPC-n-m $C_nH_{2n+1}$—⟨Cy⟩—⟨Ph⟩—⟨Ph(F)⟩—⟨Ph⟩—$C_mH_{2m+1}$
CPGP-n-m $C_nH_{2n+1}$—⟨Ph⟩—⟨Ph(F)⟩—⟨Ph(F)⟩—⟨Ph⟩—$C_mH_{2m+1}$
PGIGP-n-m TABLE D-continued
Illustrative structures
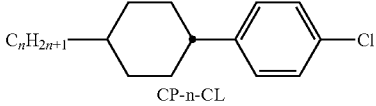
CP-n-CL
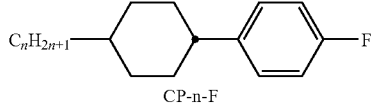
CP-n-F
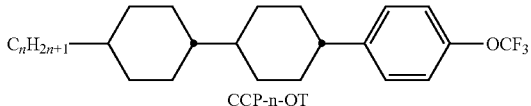
CCP-n-OT
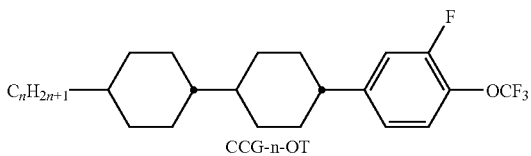
CCG-n-OT
CCP-n-CL
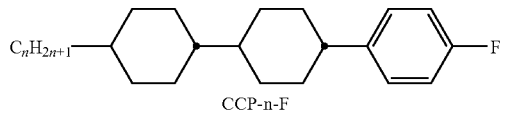
CCP-n-F
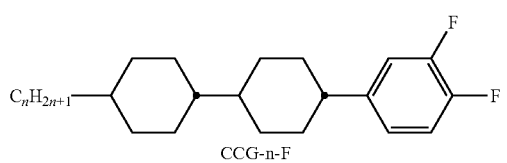
CCG-n-F
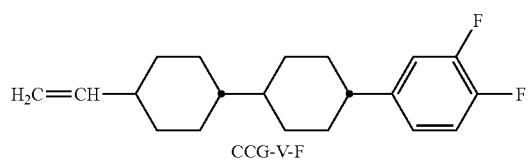
CCG-V-F
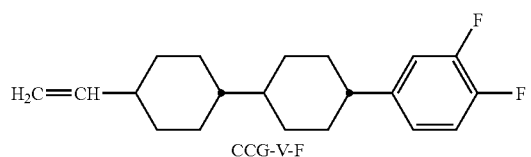
CCG-V-F
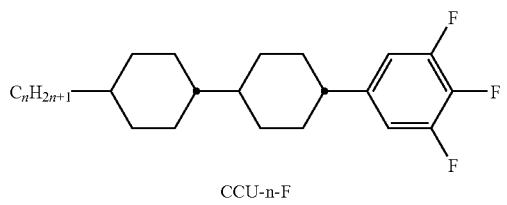
CCU-n-F TABLE D-continued
| Illustrative structures |
|---|
| 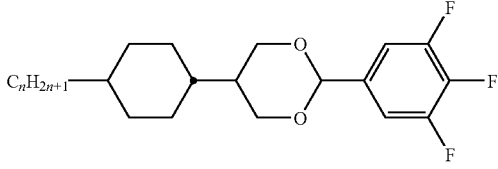  CDU-n-F |
| 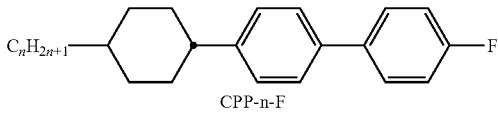  CPP-n-F |
| 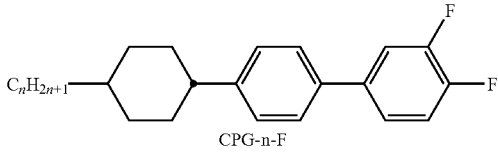  CPG-n-F |
| 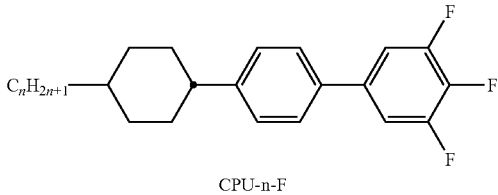  CPU-n-F |
| 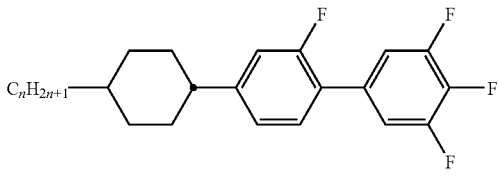  CGU-n-F |
| 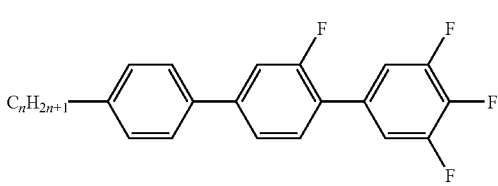  PGU-n-F |
| 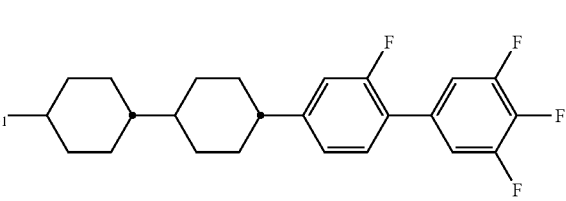  CCGU-n-F |
| 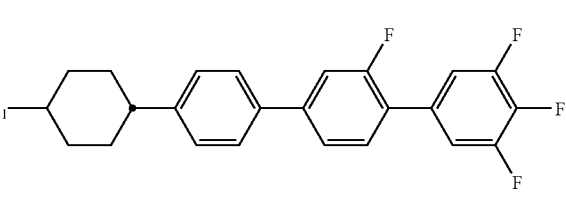  CPGU-n-F |

TABLE D-continued

Illustrative structures $C_nH_{2n+1}$—[2F,3'F-biphenyl]—[phenyl]—F
GGP-n-F $C_nH_{2n+1}$—[2F,3'F-biphenyl]—[phenyl]—Cl
GGP-n-CL $C_nH_{2n+1}$—[3F,2'F-biphenyl]—[phenyl]—F
PGIGI-n-F $C_nH_{2n+1}$—[3F,2'F-biphenyl]—[phenyl]—Cl
PGIGI-n-CL $C_nH_{2n+1}$—[cyclohexyl]—[phenyl]—[2F-phenyl]—[3,5-diF-phenyl]—OCF$_3$
CPGU-n-OT $C_nH_{2n+1}$—[phenyl]—[phenyl]—[2F-phenyl]—[3,4,5-triF-phenyl]
PPGU-n-F $C_nH_{2n+1}$—[cyclohexyl]—[cyclohexyl]—CO—O—[3,4,5-triF-phenyl]
CCQP-n-F $C_nH_{2n+1}$—[cyclohexyl]—[cyclohexyl]—CF$_2$—O—[4F-phenyl]
CCQP-n-F $C_nH_{2n+1}$—[cyclohexyl]—[cyclohexyl]—CF$_2$—O—[3,4-diF-phenyl]
CCQG-n-F TABLE D-continued
Illustrative structures
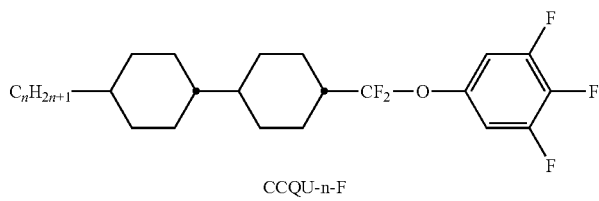
CCQU-n-F
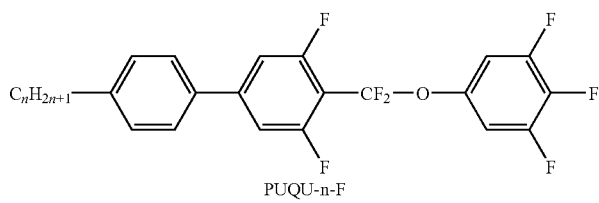
PUQU-n-F
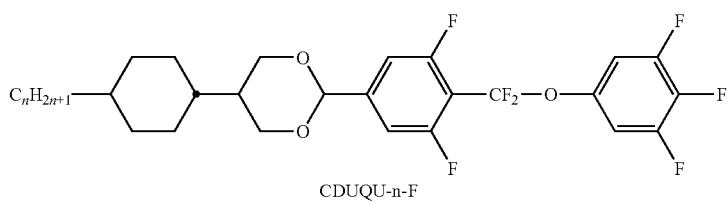
CDUQU-n-F
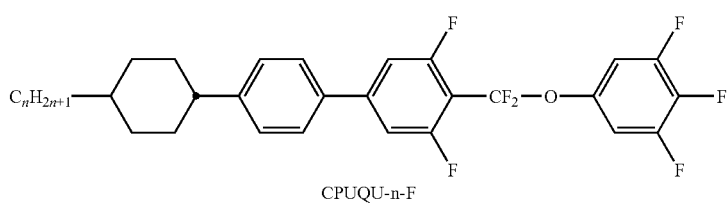
CPUQU-n-F
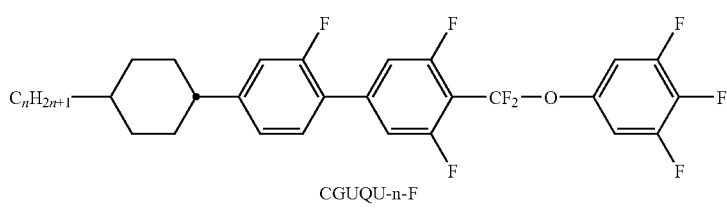
CGUQU-n-F
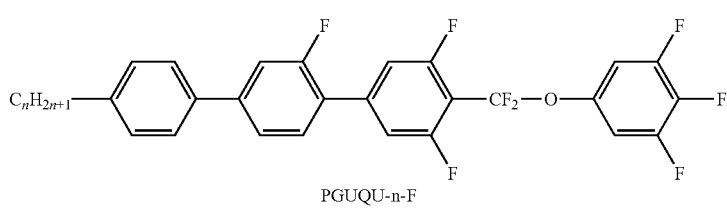
PGUQU-n-F
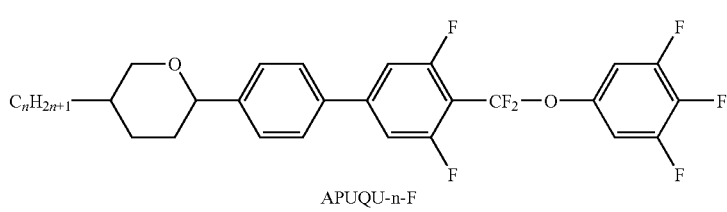
APUQU-n-F
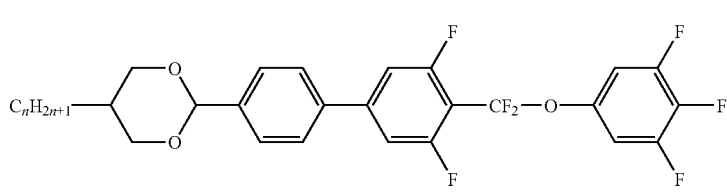

TABLE D-continued
Illustrative structures
DPUQU-n-F
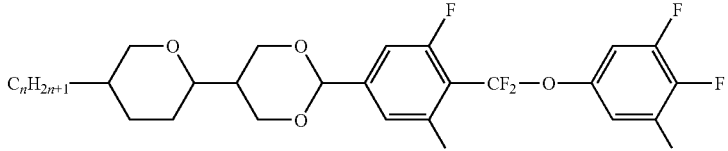
ADUQU-n-F
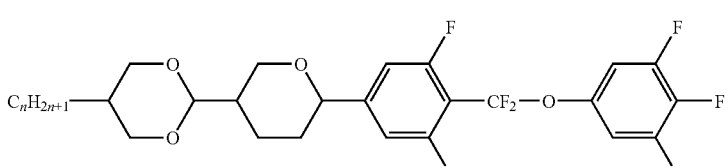
DAUQU-n-F
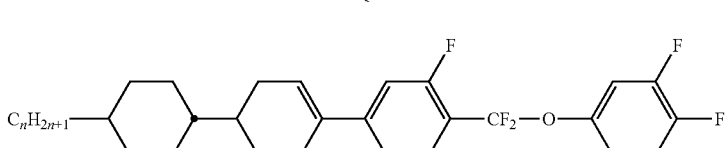
CLUQU-n-F
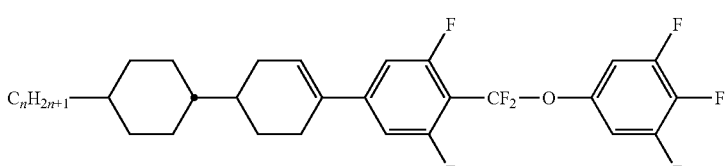
ALUQU-n-F
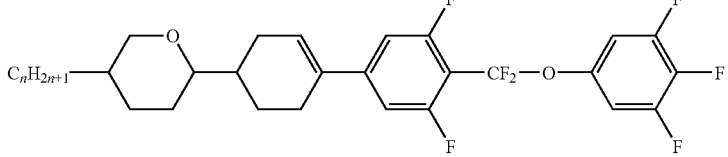
DUQU-n-F
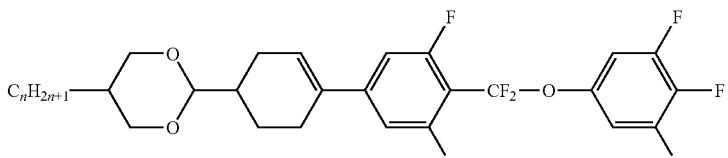
LGPQU-n-F
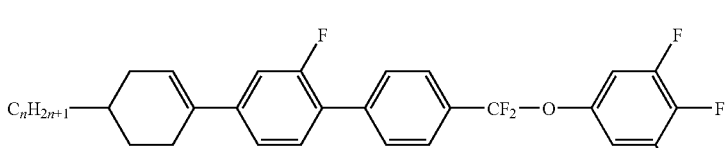
PPGGQU-n-F
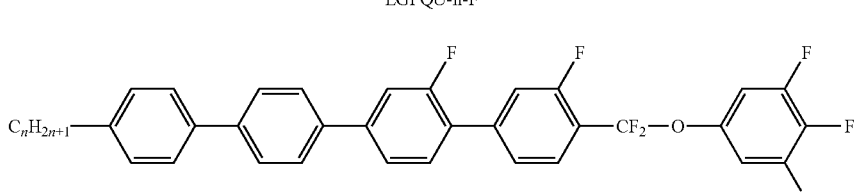

TABLE D-continued
Illustrative structures
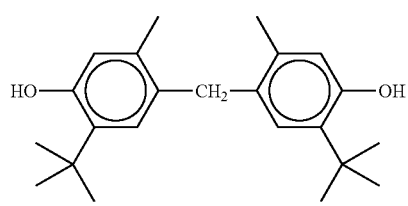
PGGGQU-n-F
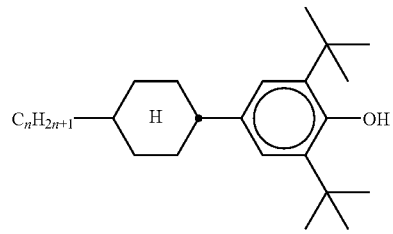
PGPUQU-n-F
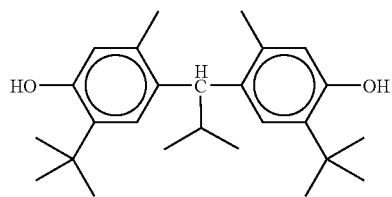
PGGUQU-n-F
The following table, Table E, shows illustrative compounds which can be used as stabiliser in the mesogenic media in accordance with the present invention.
TABLE E
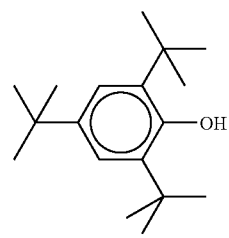
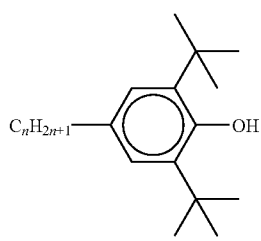
TABLE E-continued
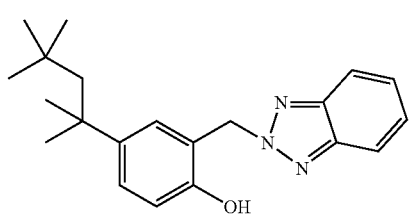

TABLE E-continued
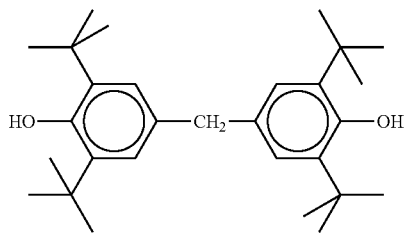
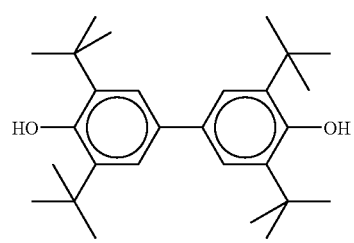
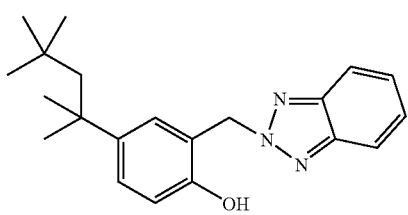
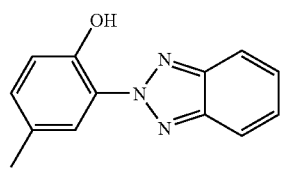
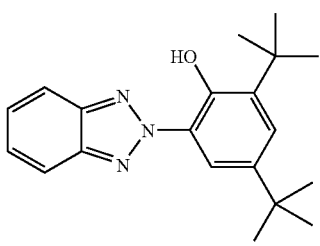
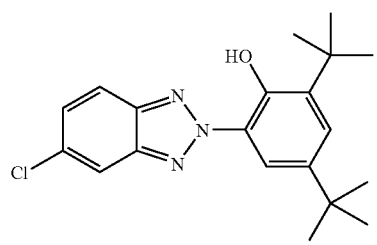
TABLE E-continued
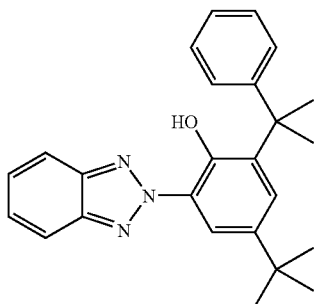
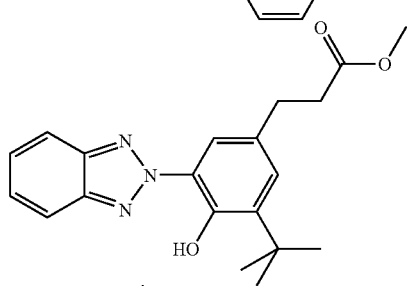
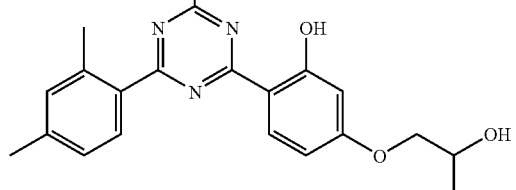
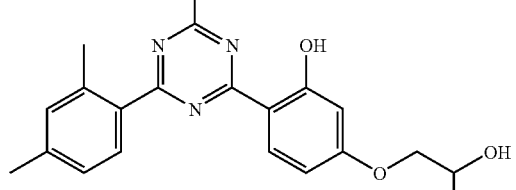

TABLE E-continued

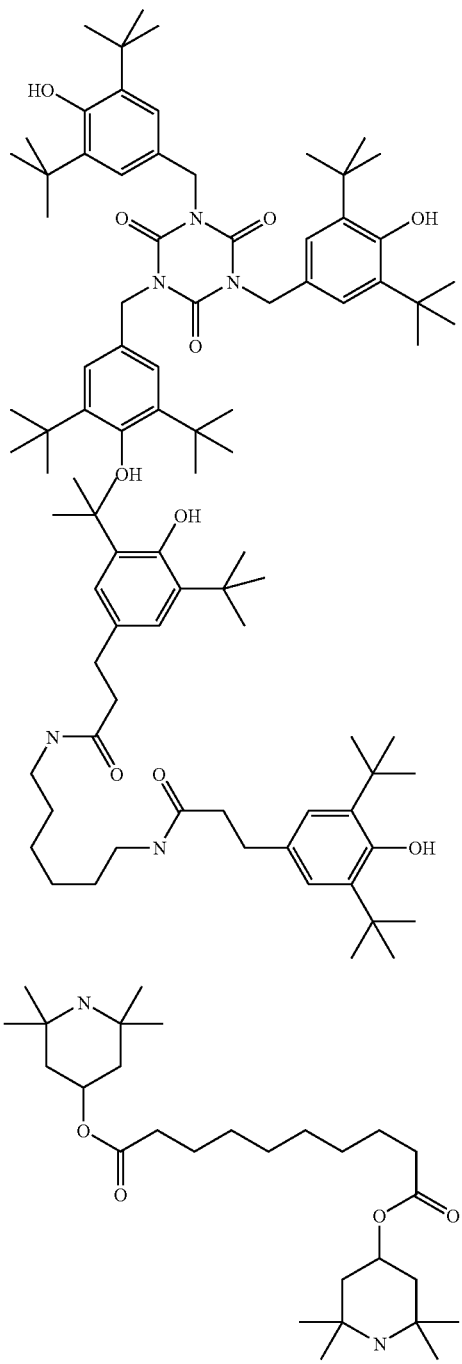

TABLE E-continued

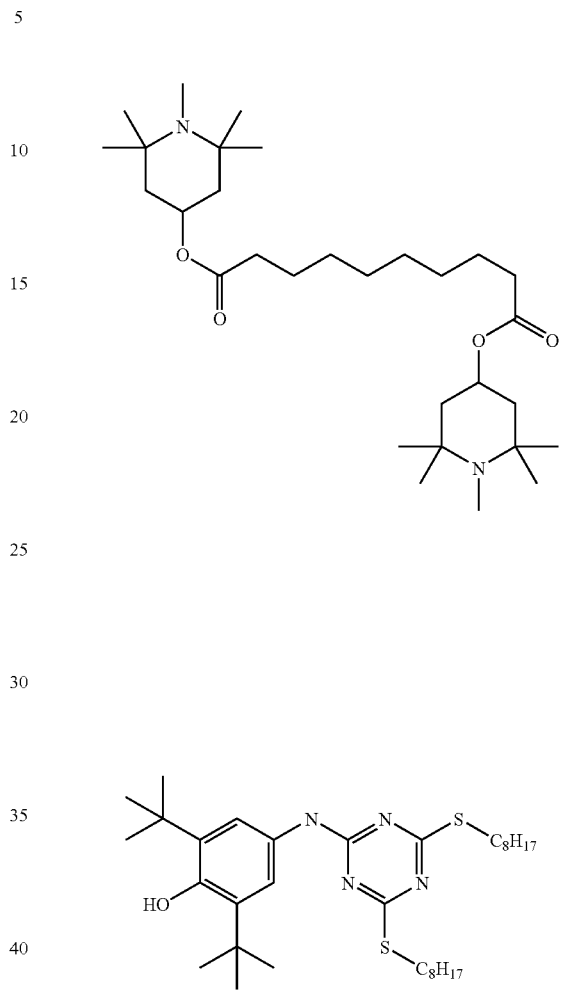

In a preferred embodiment of the present invention, the mesogenic media comprise one or more compounds selected from the group of the compounds from Table E.

The following table, Table F, shows illustrative compounds which can preferably be used as chiral dopants in the mesogenic media in accordance with the present invention.

TABLE F

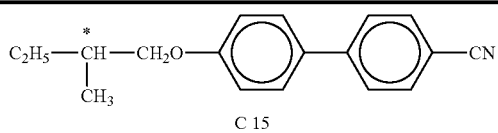

C 15

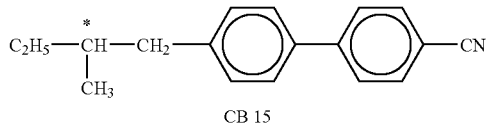

CB 15

TABLE F-continued
CM 21
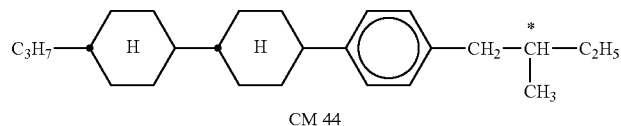
CM 44
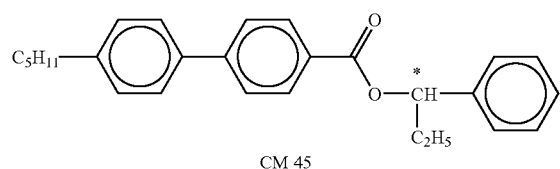
CM 45
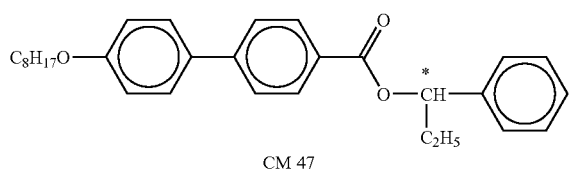
CM 47
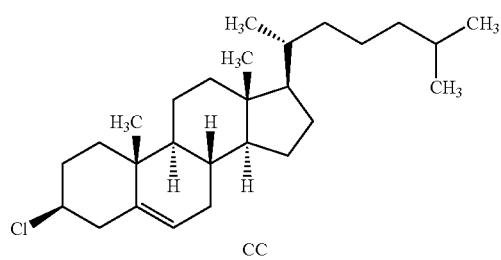
CC
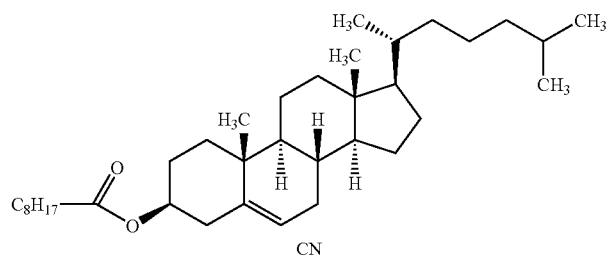
CN
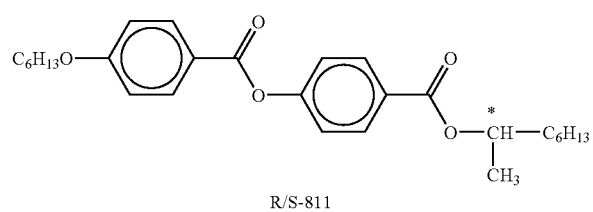
R/S-811
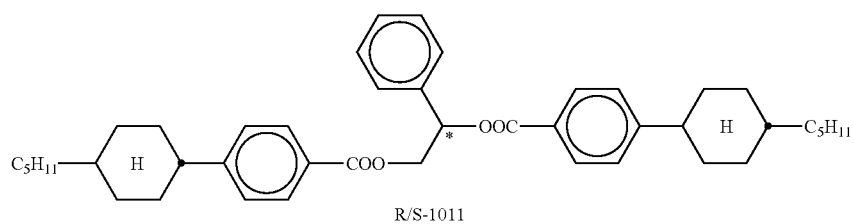
R/S-1011

TABLE F-continued

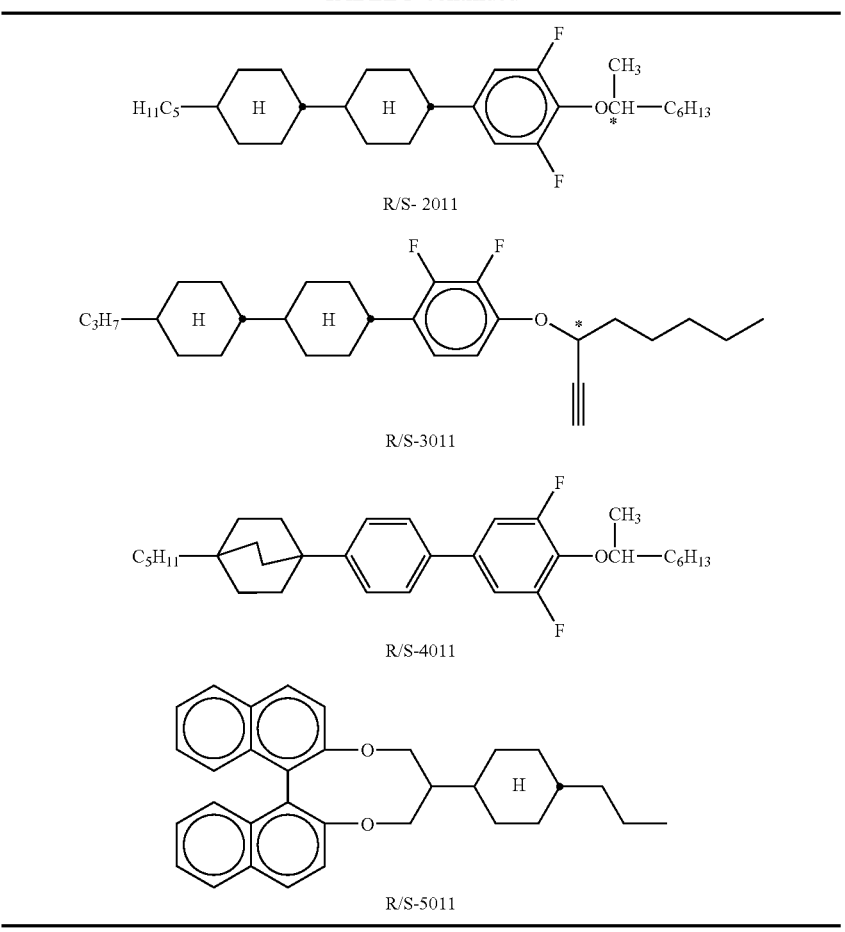

In a preferred embodiment of the present invention, the mesogenic media comprise one or more compounds selected from the group of the compounds from Table F.

The mesogenic media in accordance with the present application preferably comprise two or more, preferably four or more, compounds selected from the group consisting of the compounds from the above tables.

The liquid-crystal media in accordance with the present invention preferably comprise
seven or more, preferably eight or more, compounds, preferably compounds having three or more, preferably four or more, different formulae, selected from the group of the compounds from Table D.

EXAMPLES

The examples below illustrate the present invention without limiting it in any way.

However, the physical properties show the person skilled in the art what properties can be achieved and in what ranges they can be modified. In particular, the combination of the various properties which can preferably be achieved is thus well defined for the person skilled in the art.

Example 1

A liquid-crystal mixture having the composition and properties as indicated in the following table is prepared.

| No. | Composition Compound Abbreviation | |
|---|---|---|
| 1 | PGPUQU-3-F | 3.0 |
| 2 | PGU-3-F | 9.0 |
| 3 | PUQU-3-F | 5.0 |
| 4 | PGUQU-3-F | 5.0 |
| 5 | CC-3-V | 36.0 |
| 6 | CC-3-V1 | 7.0 |
| 7 | PP-1-2V1 | 7.0 |
| 8 | CCP-V-1 | 9.0 |
| 9 | PGP-2-3 | 6.0 |
| 10 | PGP-2-4 | 6.0 |
| 11 | PGP-2-5 | 7.0 |
| Σ | | 100.0 |

| Physical properties | |
|---|---|
| T(N, I) = | 74° C. |
| $\Delta n$ (20° C., 589.3 nm) = | 0.1348 |
| $\epsilon_{\|\|}$ (20° C., 1 kHz) = | 8.0 |
| $\Delta\epsilon$ (20° C., 1 kHz) = | 5.0 |
| $\gamma_1$ (20° C.) = | 59 mPa·s |
| $V_{10}$ (20° C.) = | 1.94 V |
| $V_{90}$ (20° C.) = | 2.85 V |

This mixture is very highly suitable for displays in TN mode and in particular for displays for use as monitor for a PC.

Example 2

A liquid-crystal mixture having the composition and properties as indicated in the following table is prepared.

| \multicolumn{3}{c}{Composition Compound} |
| No. | Abbreviation | |
|---|---|---|
| 1 | PGGUQU-3-F | 3.0 |
| 2 | PGU-3-F | 9.5 |
| 3 | PUQU-3-F | 5.0 |
| 4 | PGUQU-3-F | 4.5 |
| 5 | CC-3-V | 36.5 |
| 6 | CC-3-V1 | 7.0 |
| 7 | PP-1-2V1 | 7.0 |
| 8 | CCP-V-1 | 8.5 |
| 9 | PGP-2-3 | 6.0 |
| 10 | PGP-2-4 | 6.0 |
| 11 | PGP-2-5 | 7.0 |
| Σ | | 100.0 |

| Physical properties | |
|---|---|
| $T(N, I) =$ | 73° C. |
| $\Delta n\ (20° C., 589.3\ nm) =$ | 0.1340 |
| $\epsilon_{\parallel}\ (20° C., 1\ kHz) =$ | 8.1 |
| $\Delta\epsilon\ (20° C., 1\ kHz) = 5.1$ | |
| $\gamma_1\ (20° C.) =$ | 58 mPa·s |
| $V_{10}\ (20° C.) =$ | 1.90 V |
| $V_{90}\ (20° C.) =$ | 2.81 V |

This mixture is very highly suitable for displays in TN mode and in particular for displays for use as monitor for a PC.

Example 3

A liquid-crystal mixture having the composition and properties as indicated in the following table is prepared.

| \multicolumn{3}{c}{Composition Compound} |
| No. | Abbreviation | |
|---|---|---|
| 1 | PGGUQU-3-F | 3.0 |
| 2 | PGU-3-F | 10.0 |
| 3 | PUQU-3-F | 13.0 |
| 4 | PGUQU-3-F | 8.0 |
| 5 | CC-3-V | 34.0 |
| 6 | CC-3-V1 | 7.0 |
| 7 | CCP-V-1 | 15.0 |
| 8 | PGP-2-3 | 3.0 |
| 9 | PGP-2-4 | 4.0 |
| 10 | PGP-2-5 | 3.0 |
| Σ | | 100.0 |

| Physical properties | |
|---|---|
| $T(N, I) =$ | 74° C. |
| $\Delta n\ (20° C., 589.3\ nm) =$ | 0.1238 |
| $\epsilon_{\parallel}\ (20° C., 1\ kHz) =$ | 11.9 |
| $\Delta\epsilon\ (20° C., 1\ kHz) =$ | 8.6 |
| $\gamma_1\ (20° C.) =$ | 65 mPa·s |
| $V_{10}\ (20° C.) =$ | 1.45 V |
| $V_{90}\ (20° C.) =$ | 2.20 V V |

This mixture is very highly suitable for displays in TN mode and in particular for displays for use as monitor in a notebook (with 4 V driver).

Example 4

A liquid-crystal mixture having the composition and properties as indicated in the following table is prepared.

| \multicolumn{3}{c}{Composition Compound} |
| No. | Abbreviation | |
|---|---|---|
| 1 | PGGUQU-3-F | 3.5 |
| 2 | PGU-3-F | 11.0 |
| 3 | PUQU-3-F | 12.0 |
| 4 | PGUQU-3-F | 8.5 |
| 5 | CC-3-V | 34.0 |
| 6 | CC-3-V1 | 7.0 |
| 7 | CCP-V-1 | 14.0 |
| 8 | PGP-2-3 | 3.0 |
| 9 | PGP-2-4 | 4.0 |
| 10 | PGP-2-5 | 3.0 |
| Σ | | 100.0 |

| Physical properties | |
|---|---|
| $T(N, I) =$ | 74.5° C. |
| $\Delta n\ (20° C., 589.3\ nm) =$ | 0.1260 |
| $\epsilon_{\parallel}\ (20° C., 1\ kHz) =$ | 12.3 |
| $\Delta\epsilon\ (20° C., 1\ kHz) =$ | 8.9 |
| $\gamma_1\ (20° C.) =$ | 66 mPa·s |
| $V_{10}\ (20° C.) =$ | 1.41 V |
| $V_{90}\ (20° C.) =$ | 2.16 V |

This mixture is very highly suitable for displays in TN mode and in particular for displays for use as monitor in a notebook (with 4 V driver).

Example 5

A liquid-crystal mixture having the composition and properties as indicated in the following table is prepared.

| \multicolumn{3}{c}{Composition Compound} |
| No. | Abbreviation | |
|---|---|---|
| 1 | PGGUQU-3-F | 4.0 |
| 2 | CCU-3-F | 8.0 |
| 3 | CCQU-2-F | 10.0 |
| 4 | CCQU-3-F | 14.0 |
| 5 | PUQU-3-F | 15.0 |
| 6 | APUQU-3-F | 12.0 |
| 7 | PGUQU-3-F | 3.0 |
| 8 | CC-3-V | 18.0 |
| 9 | CC-3-V1 | 6.0 |
| 10 | CCP-V-1 | 10.0 |
| Σ | | 100.0 |

| Physical properties | |
|---|---|
| $T(N, I) =$ | 80° C. |
| $\Delta n\ (20° C., 589.3\ nm) =$ | 0.1016 |
| $\epsilon_{\parallel}\ (20° C., 1\ kHz) =$ | 19.7 |
| $\gamma_1\ (20° C.) =$ | 105 mPa·s |
| $V_{10}\ (20° C.) =$ | 1.08 V |
| $V_{90}\ (20° C.) =$ | 1.73 V |

This mixture is very highly suitable for displays in TN mode and in particular for displays for use as monitor in a notebook (with 2.5 V driver).

Example 6

A liquid-crystal mixture having the composition and properties as indicated in the following table is prepared.

| Composition Compound | | |
|---|---|---|
| No. | Abbreviation | |
| 1 | PGPUQU-3-F | 3.0 |
| 2 | PGPUQU-4-F | 3.0 |
| 2 | CP-3-CL | 3.0 |
| 3 | CPP-2-F | 3.0 |
| 4 | CPP-3-F | 3.0 |
| 5 | CPG-2-F | 6.0 |
| 6 | CPG-3-F | 7.0 |
| 7 | PGU-2-F | 7.0 |
| 8 | PGU-3-F | 6.0 |
| 9 | PUQU-2-F | 6.0 |
| 10 | PUQU-3-F | 11.0 |
| 11 | APUQU-3-F | 6.0 |
| 12 | CC-4-V | 18.0 |
| 13 | CPGP-4-3 | 6.0 |
| 14 | CPGP-5-2 | 6.0 |
| 15 | CPGP-5-3 | 6.0 |
| Σ | | 100.0 |

| Physical properties | |
|---|---|
| T(N, I) = | 101° C. |
| $n_e$ (20° C., 589.3 nm) = | 1.6624 |
| Δn (20° C., 589.3 nm) = | 0.1603 |
| $\epsilon_{\parallel}$ (20° C., 1 kHz) = | 18.4 |
| Δε (20° C., 1 kHz) = | 14.8 |
| $k_1$ (20° C.) = | 12.4 pN |
| $k_3/k_1$ (20° C.) = | 1.03 |
| $V_0$ (20° C.) = | 0.99 V |

This mixture is very highly suitable for displays in OCB mode and in particular for displays having a broad working-temperature range.

Example 7

A liquid-crystal mixture having the composition and properties as indicated in the following table is prepared.

| Composition Compound | | |
|---|---|---|
| No. | Abbreviation | |
| 1 | PGPUQU-4-F | 3.0 |
| 2 | CP-3-CL | 3.0 |
| 2 | CPP-2-F | 3.0 |
| 3 | CPP-3-F | 3.0 |
| 4 | CPG-2-F | 5.0 |
| 5 | CPG-3-F | 6.0 |
| 6 | PGU-2-F | 7.0 |
| 7 | PGU-3-F | 6.0 |
| 8 | PPGU-3-F | 2.0 |
| 9 | PUQU-2-F | 6.0 |
| 10 | PUQU-3-F | 12.0 |
| 11 | APUQU-3-F | 7.0 |
| 12 | CC-4-V | 18.0 |
| 13 | CPGP-4-3 | 7.0 |
| 14 | CPGP-5-2 | 6.0 |
| 15 | CPGP-5-3 | 6.0 |
| Σ | | 100.0 |

| Physical properties | |
|---|---|
| T(N, I) = | 101° C. |
| $n_e$ (20° C., 589.3 nm) = | 1.6629 |
| Δn (20° C., 589.3 nm) = | 0.1611 |
| $\epsilon_{\parallel}$ (20° C., 1 kHz) = | 18.3 |
| Δε (20° C., 1 kHz) = | 14.1 |
| $k_1$ (20° C.) = | 13.2 pN |
| $k_3/k_1$ (20° C.) = | 0.92 |
| $V_0$ (20° C.) = | 1.02 V |

This mixture is very highly suitable for displays in OCB mode and in particular for displays having a broad working-temperature range, such as, for example, for mobile navigation systems, in particular, for example, car navigation systems (CNSs).

Example 8

A liquid-crystal mixture having the composition and properties as indicated in the following table is prepared.

| Composition Compound | | |
|---|---|---|
| No. | Abbreviation | |
| 1 | PGPUQU-4-F | 3.0 |
| 2 | CP-3-CL | 4.0 |
| 2 | CPP-2-F | 4.0 |
| 3 | CPP-3-F | 4.0 |
| 4 | CPG-2-F | 5.0 |
| 5 | CPG-3-F | 5.0 |
| 6 | PGU-2-F | 8.0 |
| 7 | PPGU-3-F | 2.0 |
| 8 | PUQU-2-F | 6.0 |
| 9 | PUQU-3-F | 17.0 |
| 10 | APUQU-3-F | 6.0 |
| 11 | CC-4-V | 16.0 |
| 12 | CPGP-4-3 | 8.0 |
| 13 | CPGP-5-2 | 12.0 |
| Σ | | 100.0 |

| Physical properties | |
|---|---|
| T(N, I) = | 100° C. |
| $n_e$ (20° C., 589.3 nm) = | 1.6622 |
| Δn (20° C., 589.3 nm) = | 0.1601 |
| $\epsilon_{\parallel}$ (20° C., 1 kHz) = | 18.2 |
| Δε (20° C., 1 kHz) = | 14.0 |
| $\gamma_1$ (20° C.) = | 158 mPa · s |
| $k_1$ (20° C.) = | 12.7 pN |
| $k_3/k_1$ (20° C.) = | 0.94 |
| $V_0$ (20° C.) = | 1.00 V |

This mixture is very highly suitable for displays in OCB mode and in particular for displays having a broad working-temperature range, for example for CNSs.

Example 9

A liquid-crystal mixture having the composition and properties as indicated in the following table is prepared.

| Composition Compound | | |
|---|---|---|
| No. | Abbreviation | |
| 1 | PGGUQU-5-F | 7.0 |
| 2 | CP-3-CL | 5.0 |

-continued

| | | |
|---|---|---|
| 2 | GGP-2-F | 3.0 |
| 3 | GGP-3-F | 3.0 |
| 4 | PGU-2-F | 6.0 |
| 5 | PGU-3-F | 8.0 |
| 6 | PGU-5-F | 8.0 |
| 7 | PUQU-2-F | 8.0 |
| 8 | PUQU-3-F | 14.0 |
| 9 | CCGU-3-F | 3.0 |
| 10 | CC-3-V1 | 7.0 |
| 11 | CCP-V-1 | 14.0 |
| 12 | CCP-V2-1 | 8.0 |
| 13 | CGPC-3-3 | 3.0 |
| 14 | CGPC-5-3 | 3.0 |
| Σ | | 100.0 |

Physical properties

| | |
|---|---|
| T(N, I) = | 91.5° C. |
| $n_e$ (20° C., 589.3 nm) = | 1.6603 |
| Δn (20° C., 589.3 nm) = | 0.1579 |
| $\epsilon_{\parallel}$ (20° C., 1 kHz) = | 22.5 |
| Δε (20° C., 1 kHz) = | 18.1 |
| $\gamma_1$ (20° C.) = | 173 mPa·s |
| $k_1$ (20° C.) = | 12.2 pN |
| $k_3/k_1$ (20° C.) = | 1.25 |
| $V_0$ (20° C.) = | 0.87 V |

This mixture is very highly suitable for displays in OCB mode and in particular for displays, for example for CNSs.

Example 10

A liquid-crystal mixture having the composition and properties as indicated in the following table is prepared.

| Composition Compound | | |
|---|---|---|
| No. | Abbreviation | |
| 1 | PGGUQU-6-F | 7.0 |
| 2 | CP-3-CL | 5.0 |
| 2 | GGP-2-F | 3.0 |
| 3 | GGP-3-F | 3.0 |
| 4 | PGU-2-F | 6.0 |
| 5 | PGU-3-F | 8.0 |
| 6 | PGU-5-F | 8.0 |
| 7 | PUQU-2-F | 8.0 |
| 8 | PUQU-3-F | 14.0 |
| 9 | CCGU-3-F | 3.0 |
| 10 | CC-3-V1 | 7.0 |
| 11 | CCP-V-1 | 14.0 |
| 12 | CCP-V2-1 | 8.0 |
| 13 | CGPC-3-3 | 3.0 |
| 14 | CGPC-5-3 | 3.0 |
| Σ | | 100.0 |

Physical properties

| | |
|---|---|
| T(N, I) = | 91.5° C. |
| $n_e$ (20° C., 589.3 nm) = | 1.6601 |
| Δn (20° C., 589.3 nm) = | 0.1575 |
| $\epsilon_{\parallel}$ (20° C., 1 kHz) = | 22.5 |
| Δε (20° C., 1 kHz) = | 18.0 |
| $\gamma_1$ (20° C.) = | 174 mPa·s |
| $k_1$ (20° C.) = | 12.1 pN |
| $k_3/k_1$ (20° C.) = | 1.25 |
| $V_0$ (20° C.) = | 0.87 V |

This mixture is very highly suitable for displays in OCB mode and in particular for displays, for example for CNSs.

Example 11

A liquid-crystal mixture having the composition and properties as indicated in the following table is prepared.

| Composition Compound | | |
|---|---|---|
| No. | Abbreviation | |
| 1 | PGGUQU5-F | 3.0 |
| 2 | PGGUQU-6-F | 4.0 |
| 2 | CP-3-CL | 5.0 |
| 3 | GGP-2-F | 3.0 |
| 4 | GGP-3-F | 3.0 |
| 5 | PGU-2-F | 6.0 |
| 6 | PGU-3-F | 8.0 |
| 7 | PGU-5-F | 8.0 |
| 8 | PUQU-2-F | 8.0 |
| 9 | PUQU-3-F | 14.0 |
| 10 | CCGU-3-F | 3.0 |
| 11 | CC-3-V1 | 7.0 |
| 12 | CCP-V-1 | 14.0 |
| 13 | CCP-V2-1 | 8.0 |
| 14 | CGPC-3-3 | 3.0 |
| 15 | CGPC-5-3 | 3.0 |
| Σ | | 100.0 |

Physical properties

| | |
|---|---|
| T(N, I) = | 91.5° C. |
| $n_e$ (20° C., 589.3 nm) = | 1.1602 |
| Δn (20° C., 589.3 nm) = | 0.1577 |
| $\epsilon_{\parallel}$ (20° C., 1 kHz) = | 22.5 |
| Δε (20° C., 1 kHz) = | 18.1 |
| $\gamma_1$ (20° C.) = | 174 mPa·s |
| $k_1$ (20° C.) = | 12.2 pN |
| $k_3/k_1$ (20° C.) = | 1.25 |
| $V_0$ (20° C.) = | 0.87 V |

This mixture is very highly suitable for displays in OCB mode and in particular for displays, for example for CNSs.

Example 12

A liquid-crystal mixture having the composition and properties as indicated in the following table is prepared.

| Composition Compound | | |
|---|---|---|
| No. | Abbreviation | |
| 1 | PGGUQU-5-F | 6.0 |
| 2 | PGGUQU-6-F | 4.0 |
| 2 | CPG-2-F | 10.0 |
| 3 | CPG-3-F | 10.0 |
| 4 | CPG-5-F | 10.0 |
| 5 | CPU-5-F | 18.0 |
| 6 | PGIGI-3-F | 7.0 |
| 7 | PGU-2-F | 2.0 |
| 8 | PGU-3-F | 10.0 |
| 9 | PGU-5-F | 10.0 |
| 10 | CCGU-3-F | 5.0 |
| 11 | CGPC-3-3 | 3.0 |
| 12 | CGPC-5-3 | 3.0 |
| 13 | CGPC-5-5 | 2.0 |
| Σ | | 100.0 |

-continued

Physical properties

| | |
|---|---|
| T(N, I) = | 105.5° C. |
| $n_e$ (20° C., 589.3 nm) = | 1.6882 |
| Δn (20° C., 589.3 nm) = | 0.1786 |
| $\epsilon_\parallel$ (20° C., 1 kHz) = | 20.3 |
| Δε (20° C., 1 kHz) = | 15.6 |
| $\gamma_1$ (20° C.) = | n.d. mPa·s |
| $k_1$ (20° C.) = | 11.1 pN |
| $k_3/k_1$ (20° C.) = | 1.33 |
| $V_0$ (20° C.) = | n.d. V |

Note: n.d.: not determined

This mixture is very highly suitable for displays in OCB mode and in particular for displays, for example for CNSs.

The invention claimed is:

1. A liquid-crystal medium, comprising:

a first dielectrically positive component, component A, comprising one or more dielectrically positive compounds of the formula I

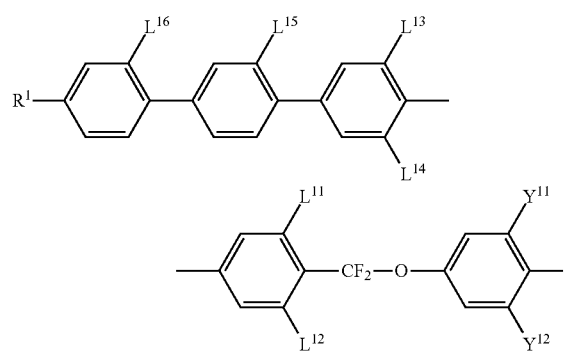

in which $R^1$ denotes alkyl, alkoxy, fluorinated alkyl or fluorinated alkoxy having 1 to 7 C atoms, alkenyl, alkenyloxy, alkoxyalkyl or fluorinated alkenyl, alkenyloxy or alkoxyalkyl having 2 to 7 C atoms, $X^1$ denotes —CN, halogen, halogenated alkyl or halogenated alkoxy having 1 to 3 C atoms or halogenated alkenyl or halogenated alkenyloxy having 2 or 3 C atoms, $Y^{11}$ and $Y^{12}$, independently of one another, denote H or F, and $L^{11}$ to $L^{16}$, independently of one another, denote H or F, and optionally a further dielectrically positive component, component B, comprising one or more dielectrically positive compounds of the formulae II and III:

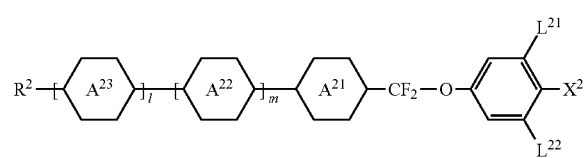

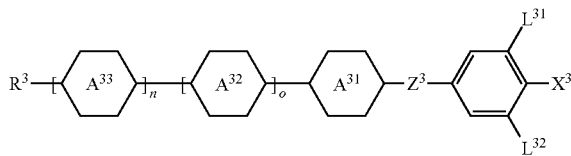

in which $R^2$ and $R^3$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

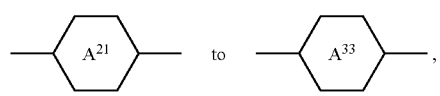

independently of one another, denote

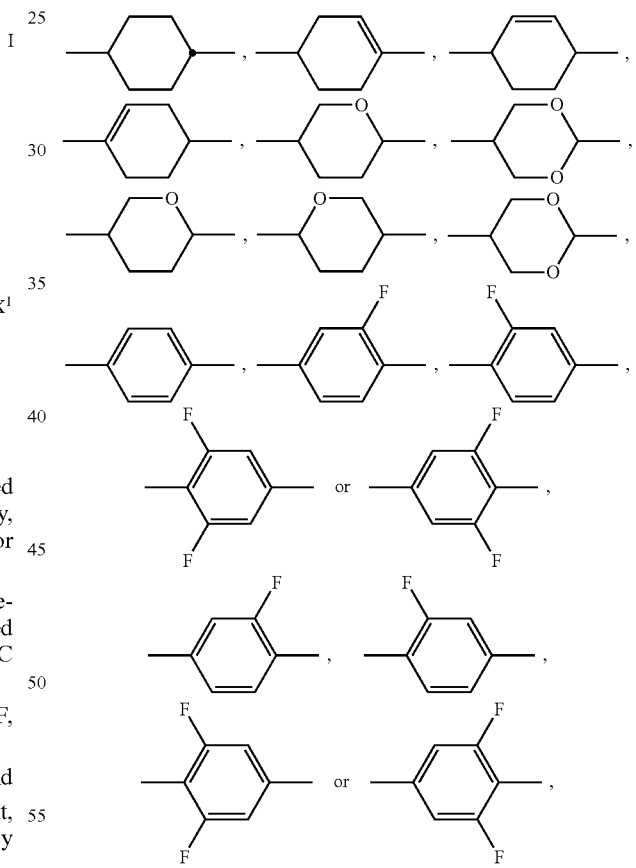

$L^{21}$, $L^{22}$, $L^{31}$ and $L^{32}$, independently of one another, denote H or F, $X^2$ and $X^3$, independently of one another, denote halogen, halogenated alkyl or alkoxy having 1 to 3 C atoms or halogenated alkenyl or alkenyloxy having 2 or 3 C atoms, $Z^3$ denotes —CH$_2$CH$_2$—, —CF$_2$CF$_2$—, —COO—, trans-CH=CH—, trans-CF=CF—, —CH$_2$O— or a single bond, and l, m, n and o, independently of one another, denote 0 or 1, and optionally a dielectrically neutral component, component C, comprising one or more dielectrically neutral compounds of the formula IV

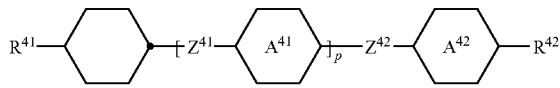

in which $R^{41}$ and $R^{42}$, independently of one another, have the meaning indicated above for $R^2$ under formula II,

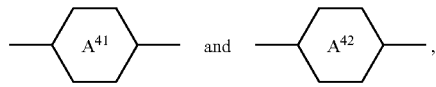

independently of one another and, if

occurs twice, also these independently of one another, denote

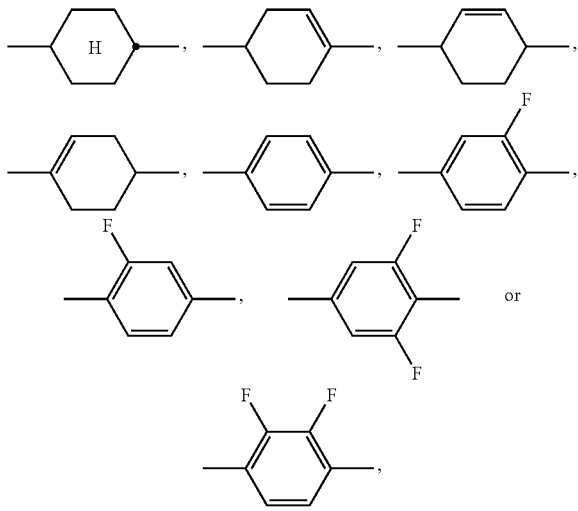

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

2. The liquid-crystal medium according to claim 1, wherein the concentration of component A in the medium is in the range from 1% to 30%.

3. The liquid-crystal medium according to claim 1, wherein component A comprises one or more compounds of the formula I in which $X^1$ denotes F.

4. The liquid-crystal medium according to claim 1, comprising one or more compounds of the formula II.

5. The liquid-crystal medium according to claim 1, comprising one or more compounds of the formula III.

6. The liquid-crystal medium according to claim 1, comprising one or more dielectrically neutral compounds of the formula IV.

7. The liquid-crystal medium according to claim 1, comprising a dielectrically neutral component, component D, comprising one or more dielectrically neutral compounds of the formula VI

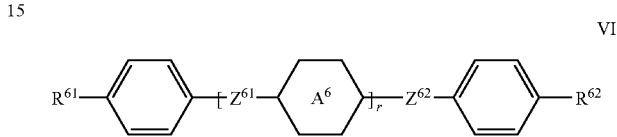

in which $R^{61}$ and $R^{62}$, independently of one another, have the meaning indicated for $R^2$,

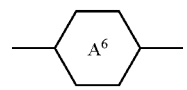

and, if it occurs twice, independently of one another on each occurrence, denotes

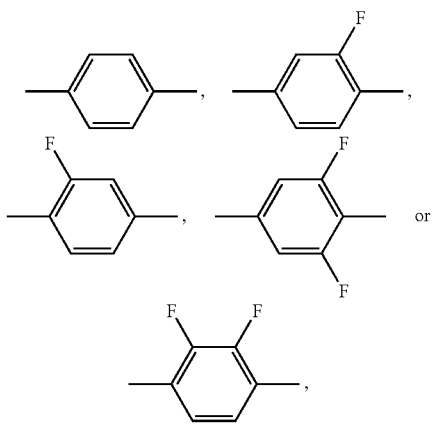

$Z^{61}$ and $Z^{62}$, independently of one another and, if $Z^{61}$ occurs twice, also these independently of one another, denote —CH$_2$CH$_2$—, —COO—, trans-CH=CH—, trans-CF=CF—, —CH$_2$O—, —CF$_2$O—or a single bond, and r denotes 0, 1 or 2.

8. The liquid-crystal display, comprising a liquid-crystal medium according to claim 1.

9. The liquid-crystal display according to claim 8, addressed by an active matrix.

10. The liquid-crystalline medium according to claim 1, comprising a compound of formula IA-3.

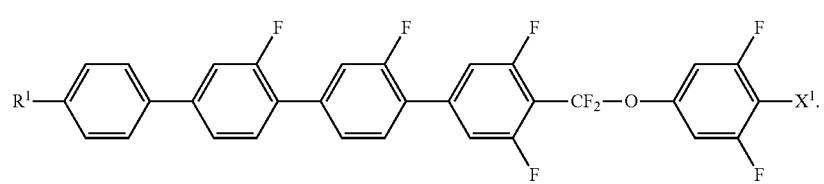
IA-3
11. The liquid-crystalline medium according to claim 1, wherein $X^1$ is $CF_3$ or $OCF_3$.
12. The liquid-crystalline medium according to claim 1, wherein $X^1$ is $CF_3$.
* * * * *

UNITED STATES PATENT AND TRADEMARK OFFICE
CERTIFICATE OF CORRECTION

PATENT NO. : 8,012,370 B2
APPLICATION NO. : 12/681461
DATED : September 6, 2011
INVENTOR(S) : Michael Wittek et al.

It is certified that error appears in the above-identified patent and that said Letters Patent is hereby corrected as shown below:

Column 72, lines 50-55 delete:

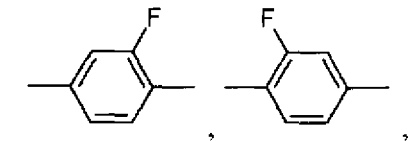
,

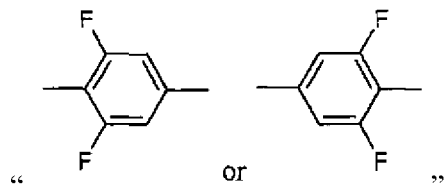
" or "

Signed and Sealed this
Thirty-first Day of January, 2012

David J. Kappos
*Director of the United States Patent and Trademark Office*